United States Patent
Oikawa et al.

(10) Patent No.: US 10,725,653 B2
(45) Date of Patent: Jul. 28, 2020

(54) IMAGE PROCESSING DEVICE, IMAGE PROCESSING SYSTEM, AND IMAGE PROCESSING METHOD

(71) Applicant: RICOH COMPANY, Ltd., Ohta-Ku (JP)

(72) Inventors: Tatsuyuki Oikawa, Tokyo (JP); Ayako Watanabe, Kanagawa (JP); Shigeru Nakamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 63 days.

(21) Appl. No.: 15/585,196

(22) Filed: May 3, 2017

(65) Prior Publication Data

US 2017/0344248 A1 Nov. 30, 2017

(30) Foreign Application Priority Data

May 25, 2016 (JP) .................................. 2016-104554

(51) Int. Cl.
*G06F 3/0488* (2013.01)
*G06F 3/14* (2006.01)

(52) U.S. Cl.
CPC ........ *G06F 3/04883* (2013.01); *G06F 3/1423* (2013.01); *G06F 3/1454* (2013.01); *G06F 2203/04803* (2013.01); *G09G 2340/0407* (2013.01); *G09G 2340/12* (2013.01)

(58) Field of Classification Search
None
See application file for complete search history.

(56) References Cited

U.S. PATENT DOCUMENTS

| 8,826,452 B1* | 9/2014 | He .......................... G06F 21/84 |
| | | 726/27 |
| 9,961,295 B2* | 5/2018 | Takada .................. G06F 3/1446 |
| 2002/0008692 A1 | 1/2002 | Omura et al. |

(Continued)

FOREIGN PATENT DOCUMENTS

| JP | 2000-043484 | 2/2000 |
| JP | 2003-069767 A | 3/2003 |

(Continued)

OTHER PUBLICATIONS

Japanese Office Action dated Mar. 3, 2020, issued in corresponding Japanese Patent Application No. 2016-104554, 4 pages.

*Primary Examiner* — Howard Cortes
(74) *Attorney, Agent, or Firm* — Xsensus LLP

(57) ABSTRACT

An image processing device, an image processing system, and a method of processing an image. The image processing device and the method includes displaying a first screen and a second screen using an image processing device connected to an image display apparatus, controlling a display to display one of the first screen and the second screen on the image display apparatus, acquiring from the image display apparatus discrimination data including at least data for distinguishing between the first screen and the second screen, and determining a partition between the first screen and the second screen based on the discrimination data. The image processing system includes an image display apparatus and at least one information processing device.

19 Claims, 19 Drawing Sheets

(56) References Cited

U.S. PATENT DOCUMENTS

| | | | |
|---|---|---|---|
| 2005/0015731 A1* | 1/2005 | Mak | G06F 3/0481 715/779 |
| 2005/0235221 A1* | 10/2005 | Asoh | G06F 1/3203 715/789 |
| 2006/0253797 A1* | 11/2006 | Madan | G06F 3/0483 715/792 |
| 2008/0148184 A1* | 6/2008 | Davis | G06F 3/1423 715/810 |
| 2009/0160883 A1* | 6/2009 | Sonobe | G09G 5/00 345/699 |
| 2011/0144970 A1* | 6/2011 | Jiang | G06F 13/105 703/24 |
| 2011/0310070 A1* | 12/2011 | Zeng | G06F 3/1423 345/204 |
| 2012/0050314 A1* | 3/2012 | Wang | G06F 3/1446 345/619 |
| 2012/0297297 A1* | 11/2012 | Tseng | G06F 3/1454 715/273 |
| 2013/0076591 A1* | 3/2013 | Sirpal | G06F 3/1438 345/1.3 |
| 2013/0120251 A1* | 5/2013 | Lee | G06F 3/1438 345/157 |
| 2013/0176415 A1* | 7/2013 | Kim | H04N 5/23219 348/78 |
| 2015/0030316 A1 | 1/2015 | Oikawa | |
| 2015/0149909 A1 | 5/2015 | Nakamura et al. | |
| 2015/0271214 A1 | 9/2015 | Oikawa | |
| 2015/0296176 A1* | 10/2015 | Kato | H04N 7/15 348/14.08 |
| 2017/0053427 A1 | 2/2017 | Oikawa | |
| 2017/0064252 A1 | 3/2017 | Inoue et al. | |
| 2017/0075517 A1* | 3/2017 | Na | G06F 3/04817 |
| 2018/0039470 A1* | 2/2018 | Tokita | G06F 3/1423 |

FOREIGN PATENT DOCUMENTS

| | | |
|---|---|---|
| JP | 2004-171131 A | 6/2004 |
| JP | 2009-080455 A | 4/2009 |
| JP | 2009-146030 A | 7/2009 |
| JP | 2009-251273 | 10/2009 |
| JP | 2010-108511 A | 5/2010 |
| JP | 2013-061411 A | 4/2013 |
| JP | 2015-036940 A | 2/2015 |
| JP | 2015-184668 A | 10/2015 |
| JP | 2017-068684 | 4/2017 |
| WO | 2014-136400 A1 | 9/2014 |

\* cited by examiner

| SETTING | SCREEN DISPLAYED ON DISPLAY OF LAPTOP PC (FIRST SCREEN) | SCREEN DISPLAYED ON DISPLAY OF ELECTRONIC WHITEBOARD (SECOND SCREEN) |
|---|---|---|
| DUPLICATION | APP | SAME AS ON THE LEFT |
| EXPANSION | DSK | APP |

FIG. 8

| MODE | SCREEN DISPLAYED ON DISPLAY OF LAPTOP PC (FIRST SCREEN) | SCREEN DISPLAYED ON DISPLAY OF ELECTRONIC WHITEBOARD (SECOND SCREEN) |
|---|---|---|
| WHITEBOARD MODE | APP, CAP | SAME AS ON THE LEFT |
| DESKTOP MODE | DSK, CAP | SAME AS ON THE LEFT |

FIG. 11

| MODE | SCREEN DISPLAYED ON DISPLAY OF LAPTOP PC (FIRST SCREEN) | SCREEN DISPLAYED ON DISPLAY OF ELECTRONIC WHITEBOARD (SECOND SCREEN) |
|---|---|---|
| WHITEBOARD MODE | DSK | APP, CAP |
| DESKTOP MODE | DSK1 | DSK2, CAP |

IMAGE PROCESSING DEVICE, IMAGE PROCESSING SYSTEM, AND IMAGE PROCESSING METHOD

CROSS-REFERENCE TO RELATED APPLICATION

This patent application is based on and claims priority pursuant to 35 U.S.C. § 119(a) to Japanese Patent Application No. 2016-104554, filed on May 25, 2016, in the Japan Patent Office, the entire disclosure of which is hereby incorporated by reference herein.

BACKGROUND

Technical Field

Embodiments of the present disclosure relate to an image processing device, an image processing system, and an image processing method.

Background Art

Conventionally, at conferences in corporations, educational institutions, and government institutions etc., large-display electronic whiteboards may be used, which allow users to draw stroke images such as text, numbers, and figures, etc., on background images displayed on such electronic whiteboards.

As an example of a system related to such an electronic whiteboard, for example, a method of downsizing and integrating a system as a whole and a method of improving the operability, user-friendliness, and convenience have been proposed.

More specifically, firstly, a display device that displays text and images, a touch input device that has a touch panel at the front of the display device, a printer, and a controller that controls the display of the display device and the printing of the printer based on the input through the touch input device are provided for an electronic whiteboard system. In such an electronic whiteboard system, since a plurality of connection terminals that connect an information processing device such as a digital camera, digital versatile disk (DVD) player, and a video product are used, the display device can be used as a large-screen monitor. Accordingly, in such an electronic whiteboard system, a user can control the connection of an information processing device or operate the information processing device without directly using a personal computer, and the operability, user-friendliness, and convenience can be improved.

SUMMARY

Embodiments of the present disclosure described herein provide an improved image processing device, image processing system, and method of processing an image. The image processing device and the method include displaying a first screen and a second screen using an image processing device connected to an image display apparatus, controlling a display to display one of the first screen and the second screen on the image display apparatus, acquiring from the image display apparatus discrimination data including at least data for distinguishing between the first screen and the second screen, and determining a partition between the first screen and the second screen based on the discrimination data. The image processing system includes an image display apparatus and at least one information processing device.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

FIG. 7 is a diagram illustrating some screens displayed by an image processing device according to an embodiment of the present disclosure.

FIG. 8 is a diagram illustrating some screens displayed when "duplication" is set to an image processing device according to an embodiment of the present disclosure.

FIG. 11 is a diagram illustrating some screens displayed when "expansion" is set to an image processing device according to an embodiment of the present disclosure.

Figure 1:
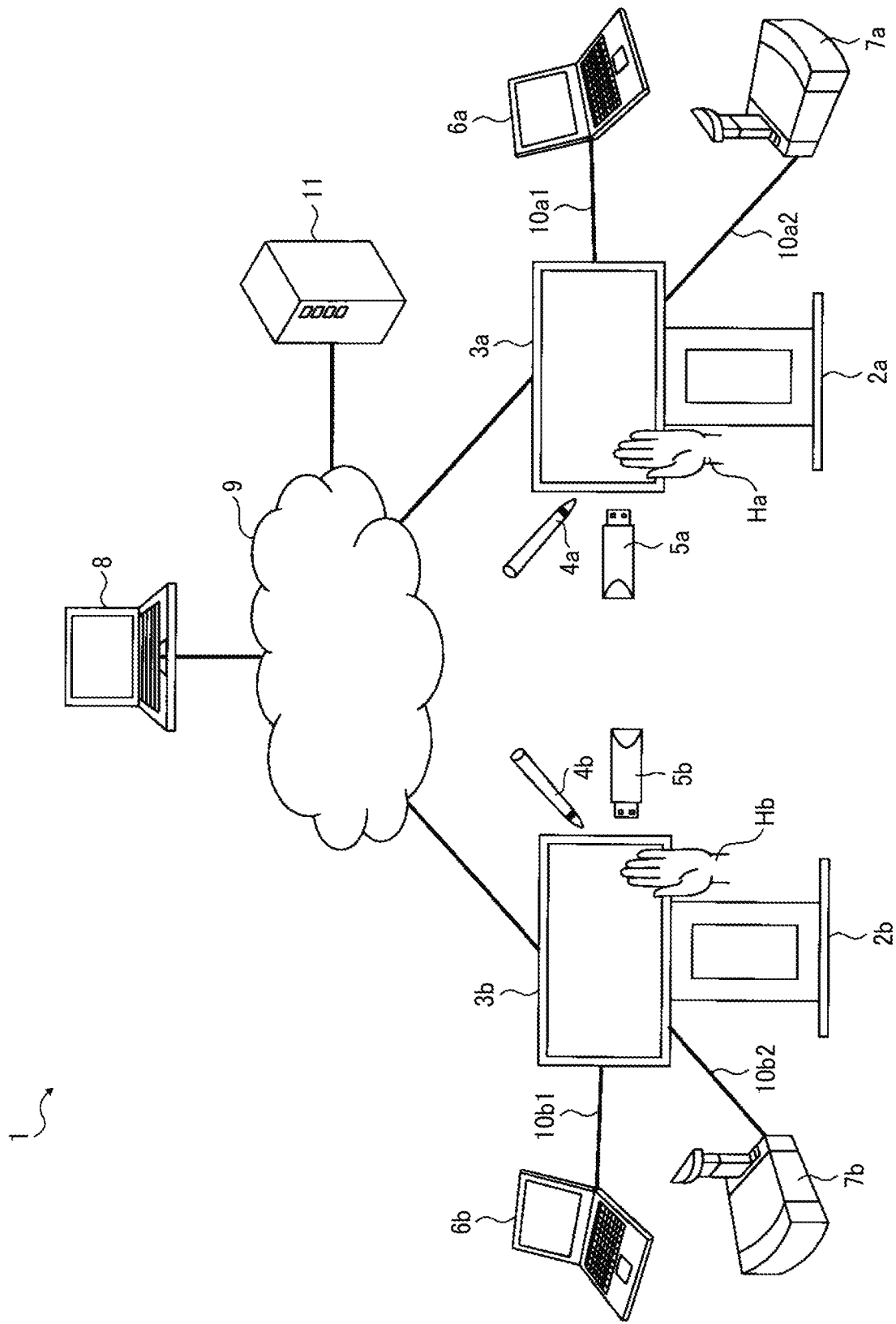
FIG. 1 is a diagram illustrating a schematic network configuration of an image processing system according to an embodiment of the present disclosure.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Embodiments of the present disclosure are described with reference to the accompanying drawings.

<Outline of System>

FIG. 1 is a diagram illustrating a schematic network configuration of an image processing system 1 according to an embodiment of the present disclosure. For purposes of simplification, only two electronic whiteboards 2a and 2b, which serve as an image display apparatus, and two electronic styluses 4a and 4b that come with these two electronic whiteboards 2a and 2b are illustrated in FIG. 1. In other words, for example, three or more electronic whiteboards and electronic styluses may be used in the image processing system 1.

As illustrated in FIG. 1, the image processing system 1 includes a plurality of electronic whiteboards 2a and 2b, a plurality of electronic styluses 4a and 4b, universal serial bus (USB) memories 5a and 5b, laptop personal computers (PCs) 6a and 6b that serve as image processing devices, video conference terminals 7a and 7b, an account server 11, and a PC 8. The electronic whiteboards 2a and 2b and the PC 8 are communicably connected to each other via a communication network 9, and the multiple electronic whiteboards 2a and 2b are provided with displays 3a and 3b, respectively.

The electronic whiteboard 2a displays an image drawn by an event caused by the electronic stylus 4a (e.g., a touch on the display 3a by the tip of the electronic stylus 4a or the tail end of the electronic stylus 4a) on the display 3a. Note also that the image being displayed on the display 3a may be modified based on an event caused not only by the electronic stylus 4a but also by, for example, a hand Ha of a user. Such an event caused by the hand of the user or the like includes, for example, gestures for zooming in or out and flipping pages. Due to such an event, the position information that is indicated, for example, by the electronic stylus 4a and the hand Ha is input to the electronic whiteboard 2a.

The USB memory 5a may be connected to the electronic whiteboard 2a, and the electronic whiteboard 2a can read electronic files such as portable document format (PDF) files from the USB memory 5a and store such electronic files in the USB memory 5a. Moreover, the laptop PC 6a is connected to the electronic whiteboard 2a through a cable 10a1 that allows communication under the standard such as DisplayPort (registered trademark), digital video interactive (DVI), high-definition multimedia interface (HDMI) (registered trademark), and video graphics array (VGA). On the electronic whiteboard 2a, an event is caused by a touch on the display 3a, and event information indicating such an event is sent to the laptop PC 6a in a similar manner to the events input through an input device such as a mouse and a keyboard. By so doing, the laptop PC 6a can be controlled. In a similar manner, the video conference terminal 7a is connected to the electronic whiteboard 2a through a cable 10a2 that enables communication under the same standard as above. Alternatively, the laptop PC 6a and the video conference terminal 7a may communicate with the electronic whiteboard 2a through a wireless connection based on various kinds of radio communication protocols such as Bluetooth (registered trademark).

At another site where the electronic whiteboard 2b is located, in a similar manner to the above, the electronic whiteboard 2b including a display 3b, an electronic stylus 4b, a USB memory 5b, a laptop PC 6b, a video conference terminal 7b, a cable 10b1, and a cable 10b2 are used. Note also that the image being displayed on the display 3b may be modified based on an event caused by, for example, a hand Hb of the user.

Accordingly, an image that is drawn on the display 3a of the electronic whiteboard 2a at one site is also displayed on the display 3b of the electronic whiteboard 2b at the other site. In a similar manner, the image that is drawn on the display 3b of the electronic whiteboard 2b at the other site is also displayed on the display 3a of the electronic whiteboard 2a at the one site. As described above, the same image can be shared among remote sites in the image processing system 1, and it is very convenient for conducting a video conference or the like among remote sites.

<Terms>

For purposes of simplification, any one of the multiple electronic whiteboards may be referred to simply as the electronic whiteboard 2 in the following description. Likewise, any one of the multiple displays of the electronic whiteboards 2 may be referred to simply as the display 3, and any one electronic stylus among multiple electronic styluses may be referred to as an electronic stylus 4. Any one of the multiple USB memories may be referred to simply as the USB memory 5, and any one of the multiple laptop PCs may be referred to simply as the laptop PC 6. Any one of the multiple video conference terminals may be referred to simply as a video conference terminal 7, and any one of the multiple hands of users may be referred to simply as the hand H. Any one of the multiple cables may be referred to simply as the cable 10.

In the present embodiment, electronic whiteboards are described as an example of image display apparatus. However, no limitation is indicated thereby. For example, the image display apparatus may be digital signage, a telestrator that is often used, for example, in sports and weather broadcasts, and a remote image (video) diagnostic device. Moreover, although the laptop PC 6 is described as an example of image processing device in the present embodiment, no limitation is indicated thereby. Thus, for example, the image processing device may be terminals that can provide image frames such as a desktop PC, a tablet PC, a personal digital assistant (PDA), a digital video camera, a digital camera, and a game machine. Further, the communication network includes, for example, the Internet, the local area network (LAN), and the mobile communication network. In the present embodiment, USB memories are described as an example of recording medium. However, no limitation is indicated thereby. For example, the recording medium may be various other kinds of recording media such as secure digital (SD) card (registered trademark).

The term visual information indicates information that a person can visually recognize. Note that the visual information may be meaningless, but in many cases, the visual information contains, for example, a letter, a figure, a symbol, or combinations thereof, which have some sort of meaning to a concerned person.

Note also that the data hand-drawn by a user on an electronic whiteboard is referred to as a stroke image.

<Example Case where Image Processing System is Used>

Figure 2:
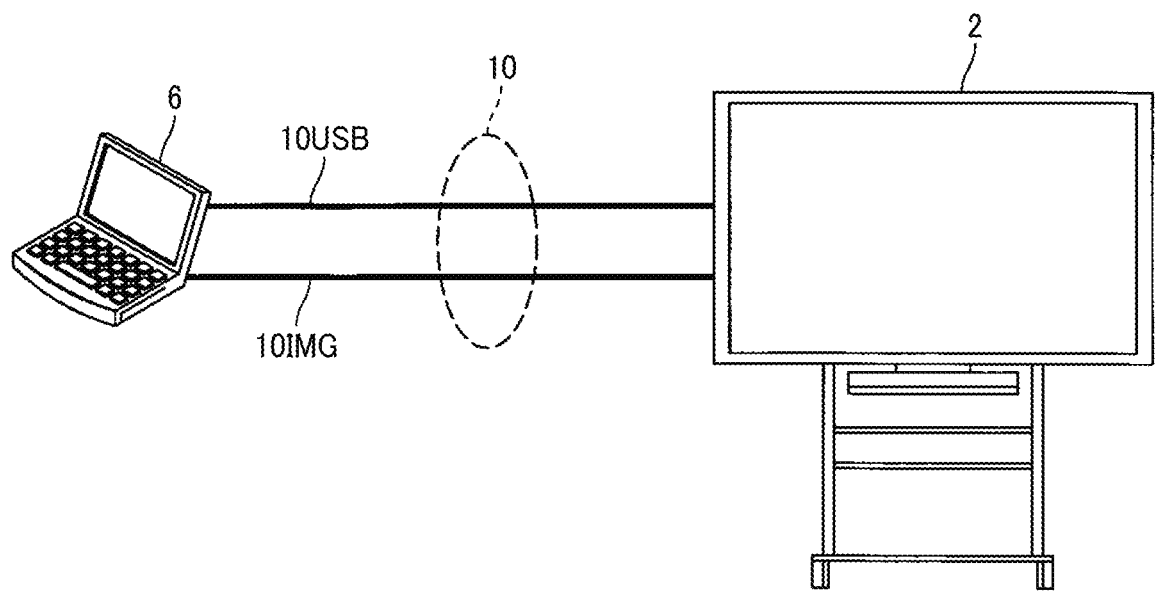
FIG. 2 is a diagram illustrating an example case where an image processing system according to an embodiment of the present disclosure is used.

For example, a user uses the image processing system 1 as follows. FIG. 2 is a diagram illustrating an example case where the image processing system 1 according to the present embodiment is used. Hereinafter, as illustrated in FIG. 2, an example case where the laptop PC 6 is connected to the electronic whiteboard 2 is described. More specifically, in the present embodiment, the laptop PC 6 is connected to the electronic whiteboard 2 through two cables 10. For example, one of the two cables 10 is a USB cable 10USB, and the other cable is a video display cable 10IMG.

The USB cable 10USB is an example of a cable for touch panel. More specifically, when a user draws an image on the electronic whiteboard 2 using the electronic stylus 4 or the like, the data that indicates, for example, the position at which the electronic whiteboard 2 is touched when the image is drawn is sent from the electronic whiteboard 2 to the laptop PC 6 through the USB cable 10USB.

The video display cable 10IMG carries the data of reference material or the like to be displayed on the electronic whiteboard 2, where such data is sent from the laptop PC 6 to the electronic whiteboard 2. In other words, the video display cable 10IMG carries the image data from the laptop PC 6 to the electronic whiteboard 2.

Accordingly, in the configuration as illustrated in FIG. 2, there are two screens, a screen displayed on the display of the laptop PC 6 and a display displayed on the electronic whiteboard 2. Hereinafter, the cases of two screens as above are described.

There are some cases in which, for example, a user who prioritizes security does not want to use the electronic whiteboard 2 unless a security protocol is applied to the electronic whiteboard 2. More specifically, for example, some users do not want to use a device with a telecommunication facility unless specific security software is installed in that device. In such cases, the users install specific application programs in the laptop PC before using the electronic whiteboard 2. Note that such application programs may be referred to simply as applications in the following description.

In the configuration as illustrated in FIG. 2, it is assumed that the device to which security application is to be applied is the laptop PC 6. As the laptop PC 6 is installed with applications, the user can use the functions implemented by the electronic whiteboard 2. For example, an image that is captured by the application is displayed on the electronic whiteboard 2 by the application. In order for the functions implemented by the application to be used, the laptop PC 6 displays an application screen. Then, when the user inputs an operation onto the application screen, for example, the laptop PC 6 can change the screen to be displayed on the electronic whiteboard 2.

Due to the steps as described above, for example, a capturing function becomes available. For example, a user can draws an image on the electronic whiteboard 2 with a plain white screen. Moreover, reference material that is prepared by the user may be captured by the laptop PC 6 to be displayed on the electronic whiteboard 2, and the user can draw an image on the displayed reference material displayed on the electronic whiteboard 2. Note that the reference material may be, for example, data generated by a presentation program such as PowerPoint (registered trademark).

The image processing system 1 may be configured as follows.

Figure 3:
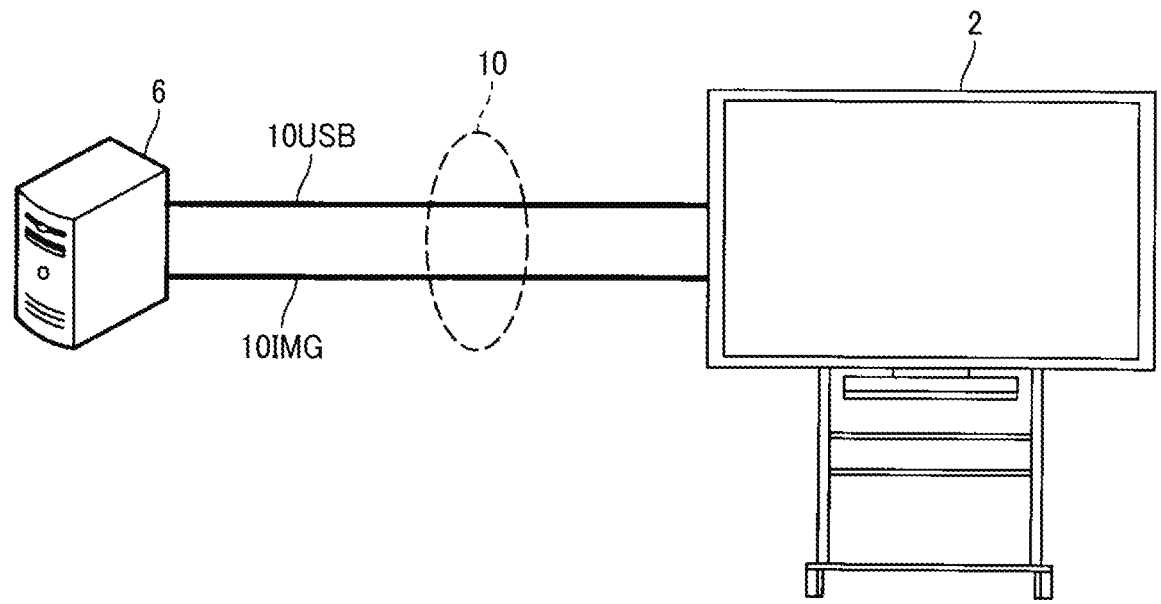
FIG. 3 is a diagram illustrating another example case where an image processing system according to an embodiment of the present disclosure is used.

FIG. 3 is a diagram illustrating another example case where the image processing system 1 according to the present embodiment is used. The configuration illustrated in FIG. 3 is different from the configuration illustrated in FIG. 2 in that the laptop PC 6 is replaced with a so-called desktop PC. In other words, the image processing device is not limited to a laptop PC, but may be other kinds of information processing device such as a tablet PC or the desktop PC as illustrated in FIG. 3.

<Hardware Configuration>

For example, the electronic whiteboard 2 has a hardware configuration as given below.

Figure 4:
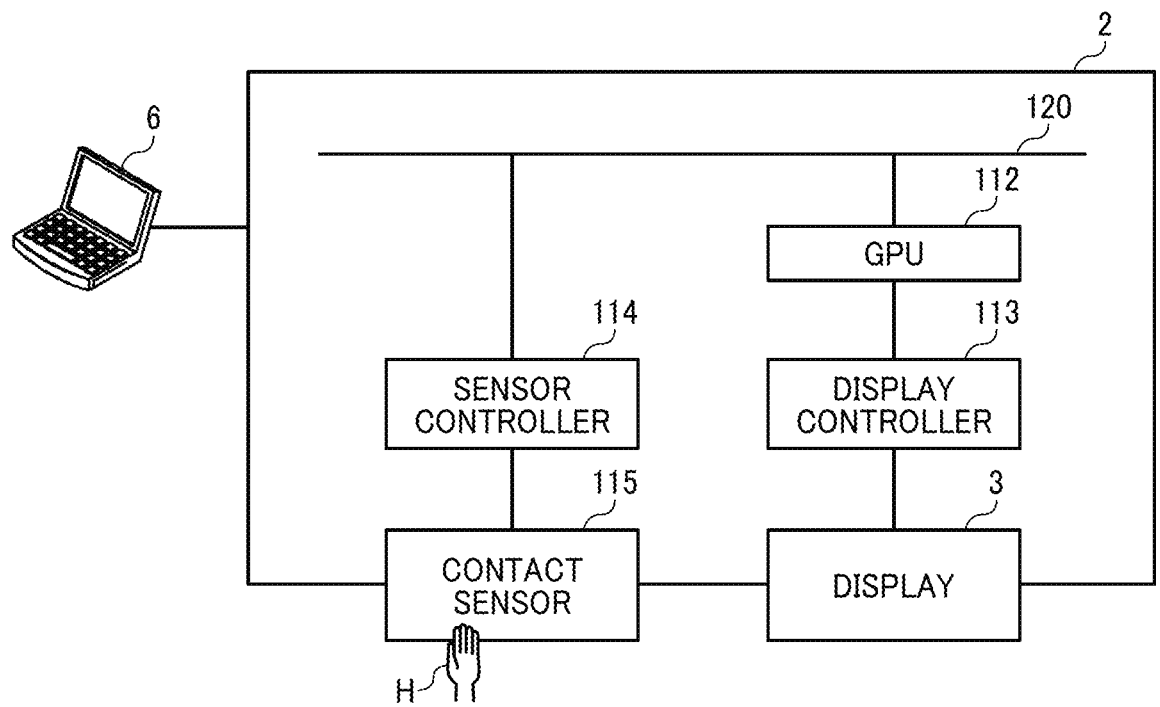
FIG. 4 is a block diagram illustrating a hardware configuration of an image display device according to an embodiment of the present disclosure.

FIG. 4 is a block diagram illustrating a hardware configuration of the image display device according to the present embodiment. As illustrated in FIG. 4, for example, the electronic whiteboard 2 includes a graphics processing unit (GPU) 112, a display controller 113, a display 3, a contact sensor 115, and a sensor controller 114.

The GPU 112 is an arithmetic unit or a controller that performs computation or control related to image processing.

The display controller 113 serves as an arithmetic unit and a controller that performs computation and control on the visual display such that the image output from the GPU 112 will be displayed on the display 3.

The display 3 is an output device that displays a display image such as an image input from the laptop PC 6 or the like.

The sensor controller 114 is an arithmetic unit that performs computation such as calculating coordinate values from the sensor data input from the contact sensor 115.

The contact sensor 115 detects, for example, a touch with a hand H and a position at which the hand H has touched. For example, the contact sensor 115 may use an infrared blocking system to detect the position at which the hand H has touched and output the sensor data that indicates the position at which the hand H has touched by coordinate values. In the infrared blocking system, more specifically, firstly, two light receivers and light emitters that are disposed at both ends of the upper side of the display 3 emit a plurality of infrared light rays parallel to the display 3. Subsequently, the emitted infrared lights are reflected by a reflector disposed at the periphery of the display 3, and a photoreceptor receives the reflected infrared lights. Then, the contact sensor 115 outputs to the sensor controller 114 identification (ID) of the infrared light that is emitted from the light receivers and light emitters and is blocked by an object such as the hand H. By so doing, the sensor controller 114 can indicate the position at which the object has touched with coordinate values based on the ID of the infrared light.

The bus 120 electrically connects elements of hardware to each other. In other words, the bus 120 is, for example, a so-called address bus and data bus.

Note also that the hardware configuration of the electronic whiteboard 2 is not limited to the hardware configuration as illustrated in FIG. 4. For example, the electronic whiteboard 2 may further include an arithmetical unit, a controller, and a memory.

For example, the laptop PC 6 has a hardware configuration as given below.

Figure 5:
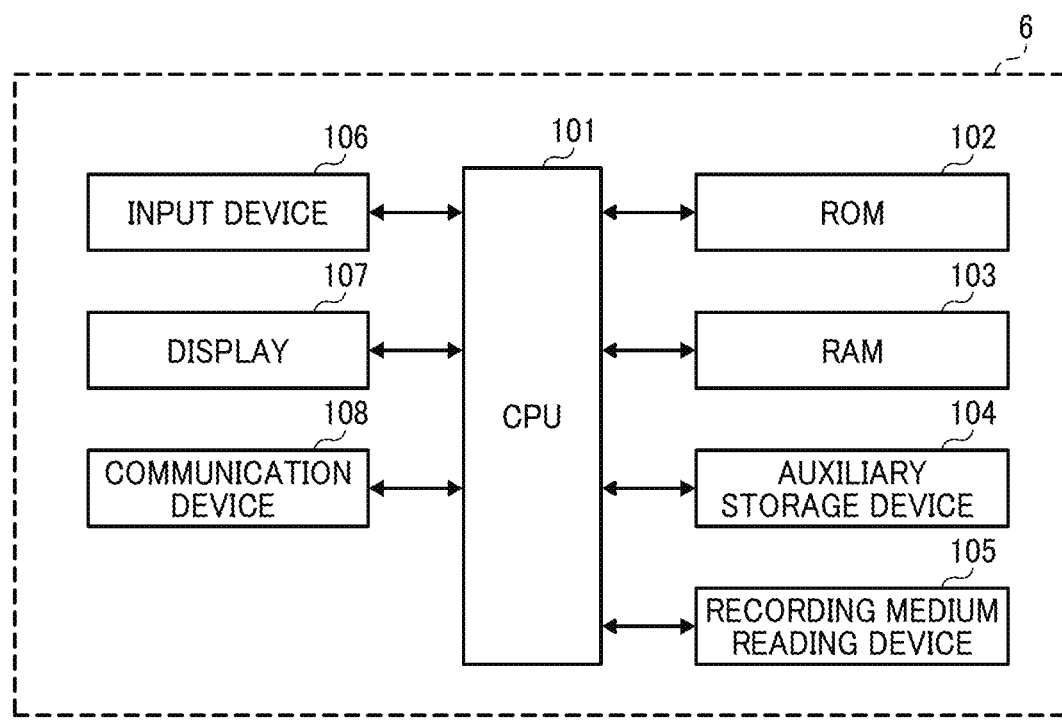
FIG. 5 is a block diagram illustrating a hardware configuration of an image processing device according to an embodiment of the present disclosure.

FIG. 5 is a block diagram illustrating a hardware configuration of the image processing device according to the present embodiment.

The laptop PC 6 includes a central processing unit (CPU) 101, a read only memory (ROM) 102, a random access memory (RAM) 103, an auxiliary storage device 104, a recording medium reading device 105, an input device 106, a display device 107, and a communication device 108. These elements of the laptop PC 6 are briefly described as below.

The CPU 101 is implemented by a microprocessor and associated circuitry, and controls the entirety of the laptop PC 6. The ROM 102 is a memory in which prescribed control programs (software components) to be executed by the CPU 101 are stored. The RAM 103 is used as a work area in which the CPU 101 executes the prescribed control programs (software components) stored in the ROM 102 to perform various kinds of control.

The auxiliary storage device 104 stores a general-purpose operating system (OS) and various kinds of data including product data and setting data related to firewalls. For example, a hard disk drive (HDD), which is a nonvolatile storage device, is used as the auxiliary storage device 104. Note also that the various kinds of information may be stored not only in the auxiliary storage device 104 but also in a recording medium such as a compact disc read-only memory (CD-ROM) and a digital versatile disk (DVD), or other various kinds of media. The various kinds of information that are stored in these recording media are computer-readable through a drive such as the recording medium reading device 105. The computer can obtain various kinds of information from a recording medium that is set to the recording medium reading device 105 on an as-needed basis.

The input device 106 is used by a user to perform various kinds of input operation. The input device 106 includes, for example, a mouse, a keyboard, and a touch panel switch that is disposed on the display screen of the display device 107. Moreover, the input device 106 is an interface such as a connector that obtains data from an external device such as an electronic whiteboard through a cable or the like. The display device 107 may be implemented, for example, by a liquid crystal display (LCD) or a cathode-ray tube (CRT) display. The communication device 108 communicates with an external device through the network. The communication device 108 supports communications over various kinds of networking such as a wired network and a wireless network.

<Functional Configuration>

As applications are installed in the laptop PC 6, for example, the laptop PC 6 has the following functional configurations.

Figure 6A:
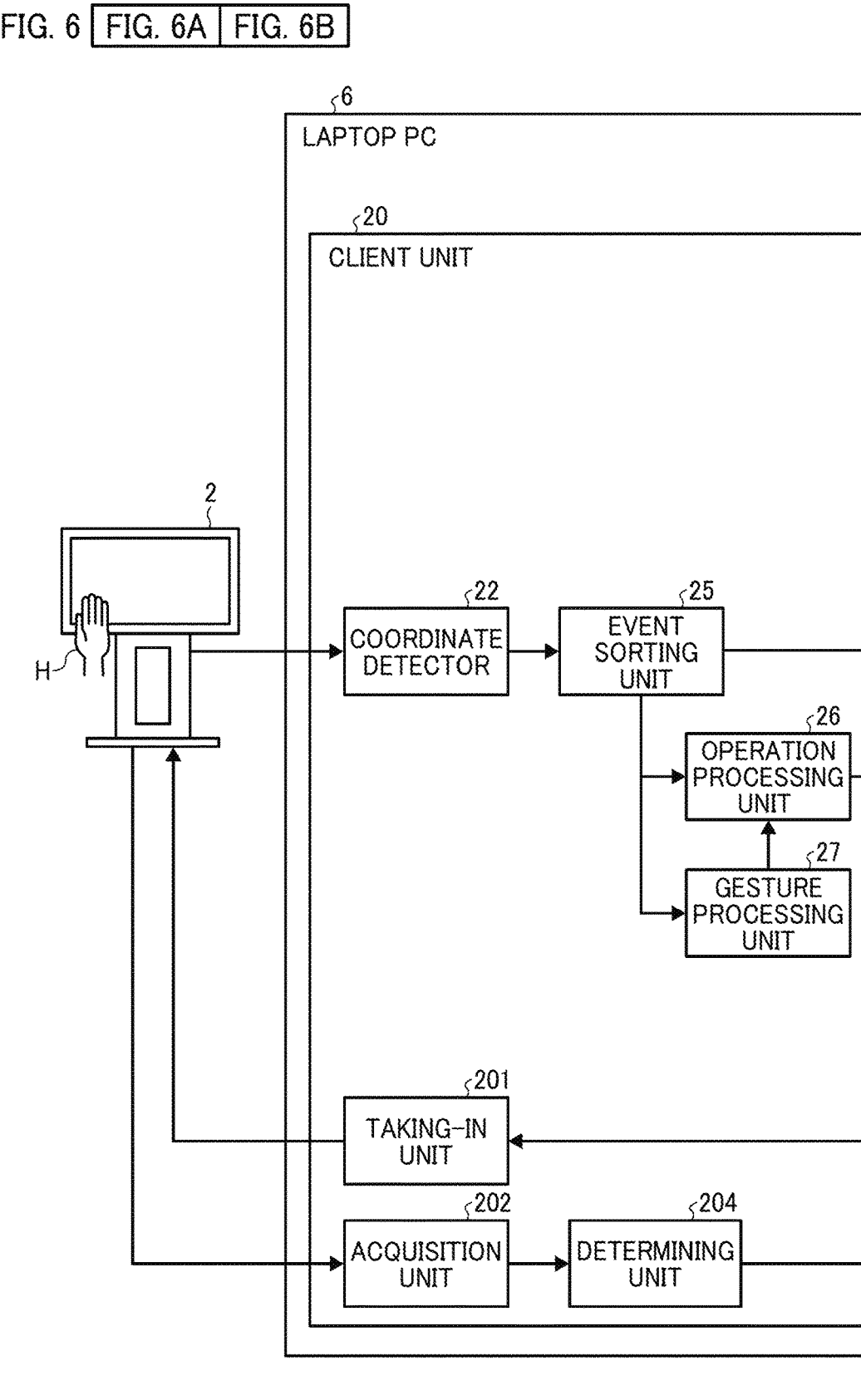
FIG. 6A and FIG. 6B are a block diagram illustrating a functional configuration of an image processing device according to an embodiment of the present disclosure.
Figure 6B:
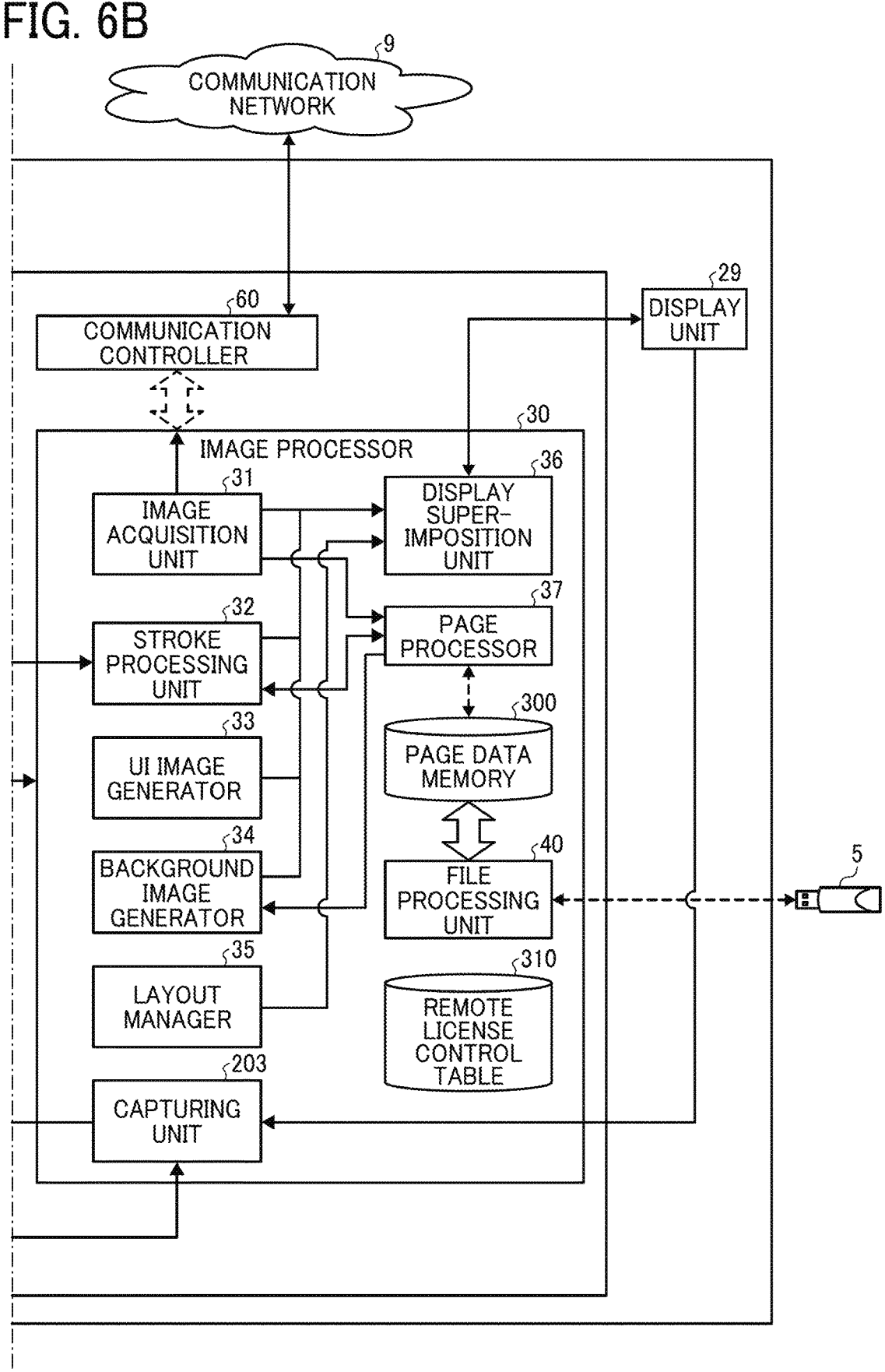

FIG. 6A and FIG. 6B are a block diagram illustrating a functional configuration of the image processing device according to the present embodiment. As illustrated in FIG. 6A and FIG. 6B, the laptop PC 6 is provided with a client unit 20 and a display unit 29. The client unit 20 is provided with a coordinate detector 22, an event sorting unit 25, an operation processing unit 26, a gesture processing unit 27, an image processor 30, and a communication controller 60.

The coordinate detector 22 obtain the data of the coordinate values input from the electronic whiteboard 2. For example, the coordinate detector 22 is implemented by the input device 106 (see FIG. 5) or the communication device 108 (see FIG. 5).

The event sorting unit 25 sorts the operation on the electronic whiteboard 2 into one of stroke drawing, a user interface (UI) operation, and a gesture operation, based on the data obtained by the coordinate detector 22, i.e., the coordinate values. Note that the event sorting unit 25 is implemented, for example, by the CPU 101 (see FIG. 5).

In cases where a stroke image is displayed on the electronic whiteboard 2, the stroke drawing is an event where, firstly, a user touches the electronic whiteboard 2 with the hand H or the like, and then the hand H is moved on the electronic whiteboard 2 with the hand touching the electronic whiteboard 2 and the touching hand H is finally detached from the electronic whiteboard 2 later. For example, characters such as alphabets "S" and "T" are drawn on the electronic whiteboard 2 by the stroke drawing. Note also that the stroke drawing includes events where images such as the drawn characters are deleted or edited.

In cases where a stroke image is displayed on the electronic whiteboard 2, the gesture operation is an event where the user modifies the image being displayed with his/her hand H. For example, zooming in or out of the image being displayed, changing the display area, clipping the pages, or a combination thereof is performed through such a gesture operation.

Further, the UI operation indicates an operation on the UI that is displayed on the electronic whiteboard 2.

When the event sorting unit 25 sorts an operation into a UI operation, the operation processing unit 26 performs processing based on the type of the UI to be operated. Note that the types of the UI includes, for example, a button (key), a list, a checkbox, and a text box. Note that the operation processing unit 26 is implemented, for example, by the CPU 101 (see FIG. 5).

When the event sorting unit 25 sorts an operation into a gesture operation, the gesture processing unit 27 performs processing based on the type of the gesture. More specifically, when a gesture operation for zooming in is input, the gesture processing unit 27 magnifies the image specified by the gesture. Note that the gesture processing unit 27 is implemented, for example, by the CPU 101 (see FIG. 5).

The image processor 30 includes an image acquisition unit 31, a stroke processing unit 32, a user interface (UI) image generator 33, a background image generator 34, a layout manager 35, a display superimposition unit 36, a page data memory 300, a file processing unit 40, and a remote license control table 310.

The image acquisition unit 31 acquires the frames of the video obtained from an external device as images. The image acquisition unit 31 outputs the image data to the page processor 37. The image of the image data is an image output from a video output device (i.e., the laptop PC 6 or the like).

When the event sorting unit 25 sorts an operation into stroke drawing, the stroke processing unit 32 draws an image, deletes an image, or edits an image based on the stroke. An image that is generated based on such stroke drawing is a stroke image.

The UI image generator 33 generates a preset UI image such as an icon for the electronic whiteboard 2.

The background image generator 34 receives media data from the page processor 37 out of the page data that the page processor 37 reads from the page data memory 300. Then, the background image generator 34 outputs the received media data to the display superimposition unit 36. Note also that the background image may be, for example, plain or in a grid pattern.

The layout manager 35 manages the layout of images output from the image acquisition unit 31, the stroke processing unit 32, the UI image generator 33, and the background image generator 34 to the display superimposition unit 36. As described above, the layout manager 35 manages the layout of images to determine, for example, on what portion of the UI image and the background image the output image and the stroke image are to be displayed or hidden.

The display superimposition unit 36 manages the layout of the images output from the image acquisition unit 31, the stroke processing unit 32, the UI image generator 33, and the background image generator 34 according to instructions for layout given by the layout manager 35.

The page processor 37 outputs the stroke array data (stroke data) of the stored page data to the stroke processing unit 32 such that the stroke can be reedited. Furthermore, the page processor 37 can delete or duplicate the stored page data.

Firstly, when the page processor 37 stores the page data in the page data memory 300, the data of the output image that is displayed on the display is stored in the page data memory 300. When the data of the output image is read from the page data memory 300, such data is read as media data that indicates the background image. Subsequently, the page processor 37 outputs the stroke array data that indicates the stroke image to the stroke processing unit 32. Note that the stroke array data is a part of the page data that is read from the page data memory 300. Moreover, the page processor 37 outputs the media data that indicates the background image to the background image generator 34. Note that the media data is also a part of the page data that is read from the page data memory 300.

The display superimposition unit 36 superimposes the output image that is output from the image acquisition unit 31, the stroke image that is output from the stroke processing unit 32, and the UI image that is output from the UI image generator 33 on the background image that is output from the background image generator 34, in accordance with the instructions for the layout given from the layout manager 35. By so doing, even if images are superimposed on top of one another, the display superimposition unit 36 can generate a layer where the output image, the stroke image, the UI image, and the background image are superimposed on top of one another in such an order that the user can view each of the images.

The file processing unit 40 accepts data input from an external device such as the USB memory 5, or outputs data to an external device such as the USB memory 5. In other words, the file processing unit 40 inputs and outputs a file to and from an external device such as the USB memory 5. Note also that the input file is stored in the page data memory 300, and the file to be output is read from the page data memory 300. Note that the file processing unit 40 is implemented, for example, by the input device 106 (see FIG. 5).

The remote license control table 310 controls a license used for performing communication with an external device that is connected through the communication network 9 or the like. Note that the remote license control table 310 is implemented, for example, by the auxiliary storage device 104 (see FIG. 5).

The display unit 29 displays an image generated by the display superimposition unit 36 on an output device such as a display or an external device connected thereto. Note that the display unit 29 is implemented, for example, by the display device 107 (see FIG. 5).

The communication controller 60 communicates with an external device through the communication network 9 to exchange data. For example, the communication controller 60 is implemented by the communication device 108 (see FIG. 5).

Further, the client unit 20 includes a taking-in unit 201, an acquisition unit 202, a capturing unit 203, and a determining unit 204.

The capturing unit 203 generates image data that indicates a screen to be displayed by the display unit 29. In other words, the capturing unit 203 captures, for example, a so-called desktop screen to generate image data that indicates the desktop screen. Note that the capturing unit 203 is implemented, for example, by the CPU 101 (see FIG. 5).

When, for example, document data or presentation data is displayed on the laptop PC 6, the capturing unit 203 captures a screen on which a reference material is displayed, based on reference-material data such as the document data or the presentation data, to generate image data. In other words, when there is a reference material that a user wishes to display on the electronic whiteboard 2, firstly, the user operates the laptop PC 6 such that the reference material will be displayed on the laptop PC 6. Then, the user inputs to the capturing unit 203 an operation to perform capturing while the reference material is being displayed on the laptop PC 6. As a result, image data that indicates a reference material can be generated by performing capturing.

The taking-in unit 201 takes in the image data generated by the capturing unit 203 such that an image based on the image data will be displayed on the electronic whiteboard 2. Note that such an image based on the taken-in image data may be referred to as a first image in the following description. In other words, the taking-in unit 201 displays on the electronic whiteboard 2 the first image that indicates, for example, a desktop screen. Note that the taking-in unit 201 is implemented, for example, by the CPU 101 (see FIG. 5).

More specifically, firstly, the taking-in unit 201 displays the first image on the electronic whiteboard 2 using an application that is installed in the laptop PC 6 in advance. Secondly, the electronic whiteboard 2 accepts an operation of drawing a character or the like on the first image from the user. Then, the electronic whiteboard 2 displays the first image on which the drawing is integrated. Note that such an image where the first image is integrated with the drawing may be referred to as a second image in the following description. In other words, for example, firstly, the electronic whiteboard 2 displays the first image, which indicates the captured reference material or the like, as the background image. Secondly, once a comment or the like is written or drawn on the reference material or the like by the user, the electronic whiteboard 2 can display the second image that indicates both the reference material or the like and the writing or drawing such as a comment. Note that the stroke image that indicates a comment or the like written or drawn by an operation is generated by the stroke processing unit 32. Accordingly, the second image is equivalent to the first image on which the stroke image is integrally superimposed.

Here, for example, the present embodiment is compared with a control sample where the electronic whiteboard 2 displays the first image without using any application. On one hand, when the application is used as in the present embodiment, the electronic whiteboard 2 can accept an operation such as writing or drawing of the user's handwriting. On the other hand, in the control sample, there are many cases in which the electronic whiteboard 2 cannot accept an operation such as writing or drawing of the user's handwriting. In other words, the first image may be displayed in the control sample, but it is difficult in the control sample to accept an operation such as drawing or writing onto the first image.

By contrast, when the taking-in unit 201 or the like is involved in the configuration, the laptop PC 6 can accept an operation such as drawing or writing onto the first image, and can display the second image that is equivalent to the first image on which a stroke image is integrally superimposed. Note that the first image indicates, for example, a reference material, and the second image indicates drawing or writing made by a user.

The acquisition unit 202 acquires data for discriminating between the first screen and the second screen. Note that such data for discriminating between the first screen and the second screen may be referred to as discrimination data. Note that the acquisition unit 202 is implemented, for example, by the input device 106 (see FIG. 5). The discrimination data is, for example, extended display identification data (EDID). Some examples of the first screen and the second screen are described as below.

<Example Screens and Example Settings>

Hereinafter, cases in which the operating system (OS) of the laptop PC 6 is the Windows (registered trademark) are described. However, not limitation is intended thereby, and the OS may be a different OS other than the Windows (registered trademark) in the present embodiment.

In the following description, cases in which a plurality of displays are connected to the laptop PC 6 are described. For example, a case in which the laptop PC 6 is connected to the multiple electronic whiteboards 2, as illustrated in FIG. 2, are described. In other words, the laptop PC 6 recognizes the display device 107 (see FIG. 5) provided for the laptop PC 6 and the display 3 (see FIG. 4) provided for the electronic whiteboard 2, and can display a screen on the screen of any of these displays. Moreover, the laptop PC 6 may be configured to display the same screen on the two displays or to display different screens on the respective two displays. Note that a configuration in which the same screen is displayed on the two displays is referred to as "duplication" and a configuration in which different screens are displayed on the respective two displays is referred to as "expansion". More specifically, when the OS is the Windows 7 (registered trademark), the user can choose either one of "expand the display screen" and "duplicate the display screen" from the pull-down menu of "multiple displays" in the settings on the "resolution of screen". For example, the relation between the settings and the screens that are displayed on the multiple displays is as follows.

FIG. 7 is a diagram illustrating some screens displayed by the image processing device according to the present embodiment.

In the table as illustrated in FIG. 7, the top row, which is indicated as "duplication" in FIG. 7, indicates example screens that are displayed on the displays when "duplication" is set to the laptop PC 6. On the other hand, in the table as illustrated in FIG. 7, the bottom row, which is indicated as "expansion" in FIG. 7, indicates example screens that are displayed on the displays when "expansion" is set to the laptop PC 6.

Hereinafter, a screen that is displayed on a display provided for a laptop PC is referred to as a "first screen". In cases where the laptop PC 6 is connected to the electronic whiteboard 2, as illustrated in FIG. 2, a screen that is displayed on a display 3 provided for the electronic whiteboard 2 is referred to as a "second screen".

As described above with reference to FIG. 2, if applications are installed in the laptop PC 6, the laptop PC 6 can display, for example, an application screen APP as illustrated in FIG. 7. A user can use the electronic whiteboard 2 by operating such application screen APP displayed on the laptop PC 6.

As illustrated in FIG. 7, the laptop PC 6 can change whether the same screen is to be displayed on the first screen and the second screen or different screens are to be displayed on the first screen and the second screen due to the settings. More specifically, In the setting "duplication" in the example illustrated in FIG. 7, the laptop PC 6 displays the application screen APP on each of the first screen and the second screen, respectively. In this setting, the same screen is to be displayed on the first screen and the second screen. Accordingly, for example, when a user inputs an operation onto the application screen APP displayed on the first screen, the screen that reflects the same operation is displayed on the second screen.

On the other hand, in the setting "expansion" in the example illustrated in FIG. 7, the laptop PC 6 displays the desktop screen DSK and the application screen APP on the first screen and the second screen, respectively. Hereinafter, cases in which the setting "expansion" is set to the laptop PC 6, as illustrated in FIG. 7, are described.

In the example as illustrated in FIG. 7, a desktop screen DSK is displayed on the first screen, and the user inputs an operation onto the desktop screen DSK to create a document or edit an image using, for example, installed programs. Note also that the screen being displayed on the first screen is not displayed on the display 3 of the electronic whiteboard 2. Accordingly, the user who uses the laptop PC 6 can operate, for example, the first screen on which the user is working, and the screen on which secret data or the like is being displayed, without being viewed by other people.

On the other hand, the screen that is displayed on the second screen is displayed by the application screen APP not only to the user who uses the laptop PC 6 but also to, for example, the participants of a conference who view the electronic whiteboard 2. Due to this configuration, for example, information can be shared by displaying the information on the second screen using the application screen APP.

At the "expansion" setting, a graphical user interface (GUI) such as a toolbar can be moved across the first screen and the second screen based on an operation made by the user. In other words, at the "expansion" setting, the user can operate the first screen and the second screen as if these screens are a single screen. For example, the user can move an icon displayed on the desktop screen DSK side to the application screen APP side by an operation such as a so-called drag-and-drop operation.

Then, there are some cases in which a reference material that is prepared by the user who operates the laptop PC 6 may be captured and the captured image is to be displayed on the electronic whiteboard 2. Hereinafter, example cases in which the setting of "duplication" is set and example cases in which the setting of "expansion" is set are described, respectively.

FIG. 8 is a diagram illustrating some screens displayed when "duplication" is set to the image processing device according to the present embodiment. In other words, screens that are displayed when "duplication" is set to the laptop PC 6 according to the present embodiment are illustrated in FIG. 8.

Hereinafter, cases in which a user uses the electronic whiteboard 2 from the laptop PC 6, i.e., cases in which an application screen APP is displayed, may be referred to as a "whiteboard mode". By contrast, cases in which a user is operating the laptop PC 6 but is not using the electronic whiteboard 2, i.e., cases in which an application screen APP is minimized and a desktop screen DSK is displayed, may be referred to as a "desktop mode".

The laptop PC 6 generates a display image to be displayed on the electronic whiteboard 2 by performing capturing processes. When the user gives instructions to generate a display image, i.e., when the user inputs an operation to perform capturing processes, the laptop PC 6 performs capturing processes. In order to handle such a situation, the laptop PC 6 displays a GUI through which the user can input such instructions. For example, such a GUI is a toolbar CAP as given below. Next, a toolbar CAP that is displayed in the whiteboard mode is described by way of example.

Figure 9:
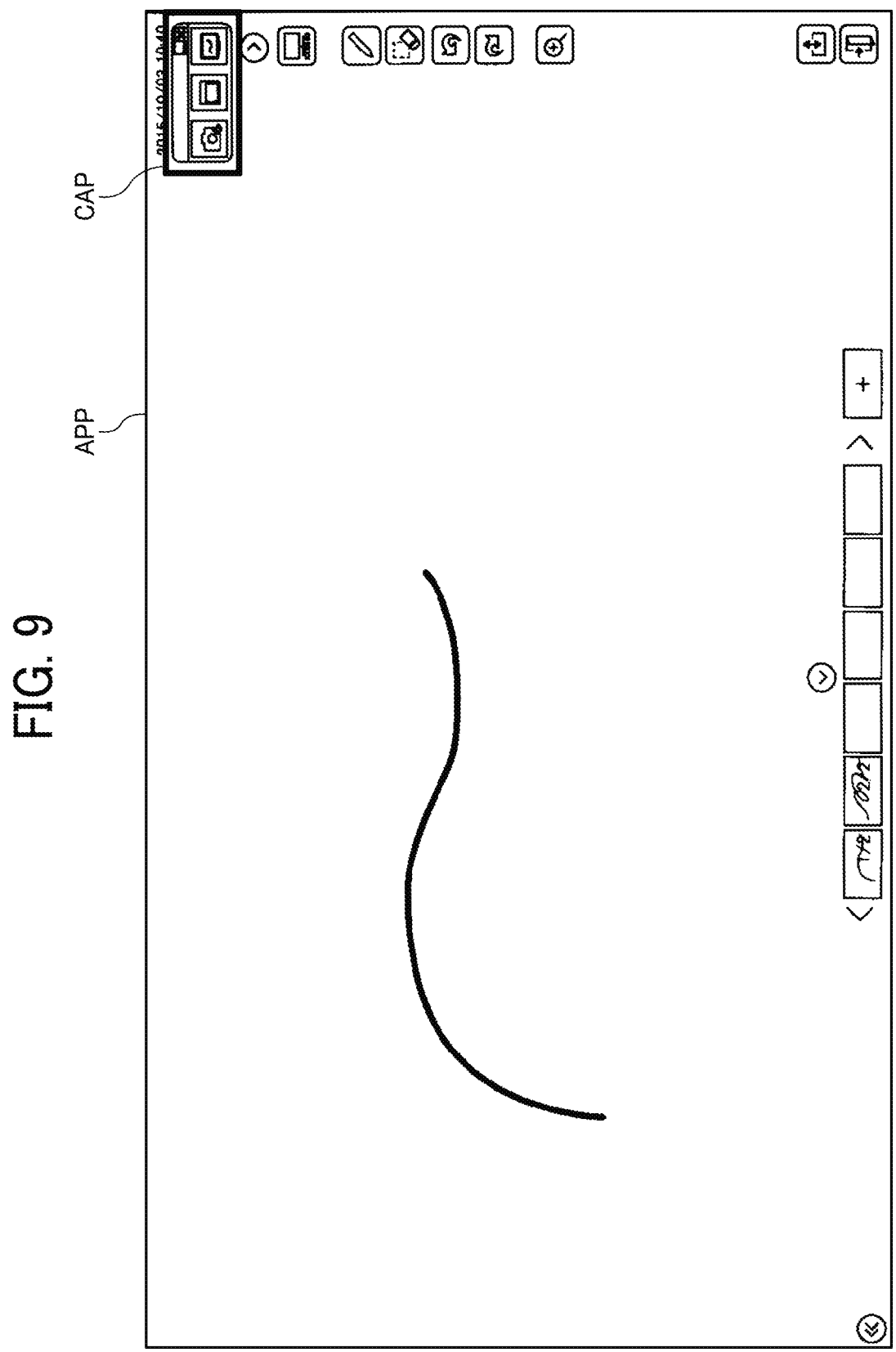
FIG. 9 is a diagram illustrating an application screen and a graphical user interface (GUI) displayed by an image processing device according to an embodiment of the present disclosure.

FIG. 9 is a diagram illustrating an application screen and a GUI displayed by an image processing device according to the present embodiment. FIG. 9 illustrates an example case in which the laptop PC 6 displays a toolbar CAP on the application screen APP in the whiteboard mode. Note also that the display position of the toolbar CAP may be moved by an operation such as a drag-and-drop operation by a user. It is desired that the toolbar CAP be displayed in the foreground of the application screen APP. Next, the toolbar CAP is described in detail.

Figure 10:
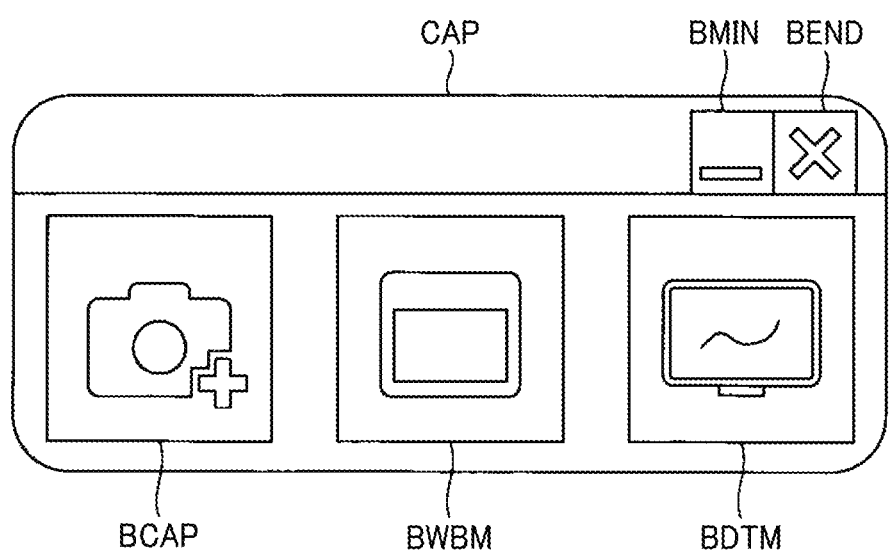
FIG. 10 is a diagram illustrating a graphical user interface (GUI) displayed by an image processing device according to an embodiment of the present disclosure.

FIG. 10 is a diagram illustrating a graphical user interface (GUI) displayed by the image processing device according to the present embodiment. In other words, a toolbar CAP as illustrated in FIG. 9 is magnified in FIG. 10. As illustrated in FIG. 10, the toolbar CAP includes, for example, a minimization button BMIN, an end button BEND, a capture button BCAP, a whiteboard mode button BWBM, and a desktop mode button BDTM.

Hereinafter, example cases in which the following processes are performed as the user operates the toolbar CAP are described.

(1) Capturing the screen displayed on the desktop screen DSK (see, for example, FIG. 7) to generate a display screen, the application screen APP importing the generated display screen (2) Switching between the whiteboard mode and the desktop mode (3) Minimizing the toolbar CAP to the taskbar (4) Terminating the application When some of the buttons of the toolbar CAP is pressed, the laptop PC 6 performs the above processes (1) to (4) as follows.

When the minimization button BMIN is pressed, the laptop PC 6 minimizes the toolbar CAP and the application screen APP. In other words, the laptop PC 6 minimizes the toolbar CAP and the application screen APP to a so-called WINDOWS taskbar. As described above, when the minimization button BMIN is pressed, the laptop PC 6 performs the processes (3) as described above.

When the end button BEND is pressed, the laptop PC 6 terminates the application.

When the end button BEND is pressed as described above, the laptop PC 6 performs the processes (4) as described above.

When any one of the whiteboard mode button BWBM and the desktop mode button BDTM is pressed, the laptop PC 6 switches between the whiteboard mode and the desktop mode. More specifically, when the desktop mode button BDTM is pressed in the whiteboard mode, the laptop PC 6 switches the whiteboard mode to the desktop mode. By contrast, when the whiteboard mode button BWBM is pressed in the desktop mode, the laptop PC 6 switches the desktop mode to the whiteboard mode. When the whiteboard mode button BWBM or the desktop mode button BDTM is pressed as described above, the laptop PC 6 performs the processes (2) as described above.

When the capture button BCAP is pressed, the laptop PC 6 selects one of the first screen and the second screen (see FIG. 7 and FIG. 8), and generates a display image that indicates the selected screen. In other words, when the capture button BCAP is pressed, the laptop PC 6 performs the processes (1) as described above. Note also that when "duplication" is set as illustrated in FIG. 8, the first screen and the second screen are the same screens regardless of the whiteboard mode and the desktop mode, and thus the display image remains the same regardless of the selected screen.

By contrast, "expansion" may be set in some cases as follows.

FIG. 11 is a diagram illustrating some screens displayed when "expansion" is set to an image processing device according to the present embodiment. In other words, screens that are displayed when "expansion" is set to the laptop PC 6 according to the present embodiment are illustrated in FIG. 11. As described above with reference to FIG. 7, when "expansion" is set to the laptop PC 6, the laptop PC 6 displays different screens on the first screen and the second screen, respectively. As illustrated in FIG. 11, in the whiteboard mode, for example, a desktop screen DSK is displayed on the first screen, and an application screen APP is displayed on the second screen.

By contrast, in the desktop mode as illustrated in FIG. 11, for example, a desktop screen DSK is displayed on both the first screen and the second screen. However, the desktop screen that is displayed on the first screen is different from the desktop screen that is displayed on the second screen. Note also that the desktop screens that are displayed on the first screen and the second screen may be referred to as a first desktop screen DSK1 and a second desktop screen DSK2 in the following description. In other words, when the desktop mode is adopted at the "expansion" setting, the laptop PC 6 can display different reference materials on the first desktop screen DSK1 and the second desktop screen DSK2, respectively, based on the operation made by a user. In particular, when the desktop mode is adopted at the "expansion" setting, there are many cases in which the user wishes to select an object to be captured from the first desktop screen DSK1 and the second desktop screen DSK2.

In view of the above circumstances, the laptop PC 6 may select one of the first screen and the second screen as the object to be captured based on, for example, the position at which the toolbar CAP (see FIG. 10) is displayed. More specifically, the laptop PC 6 makes a determination as per the following processes.

Figure 12:
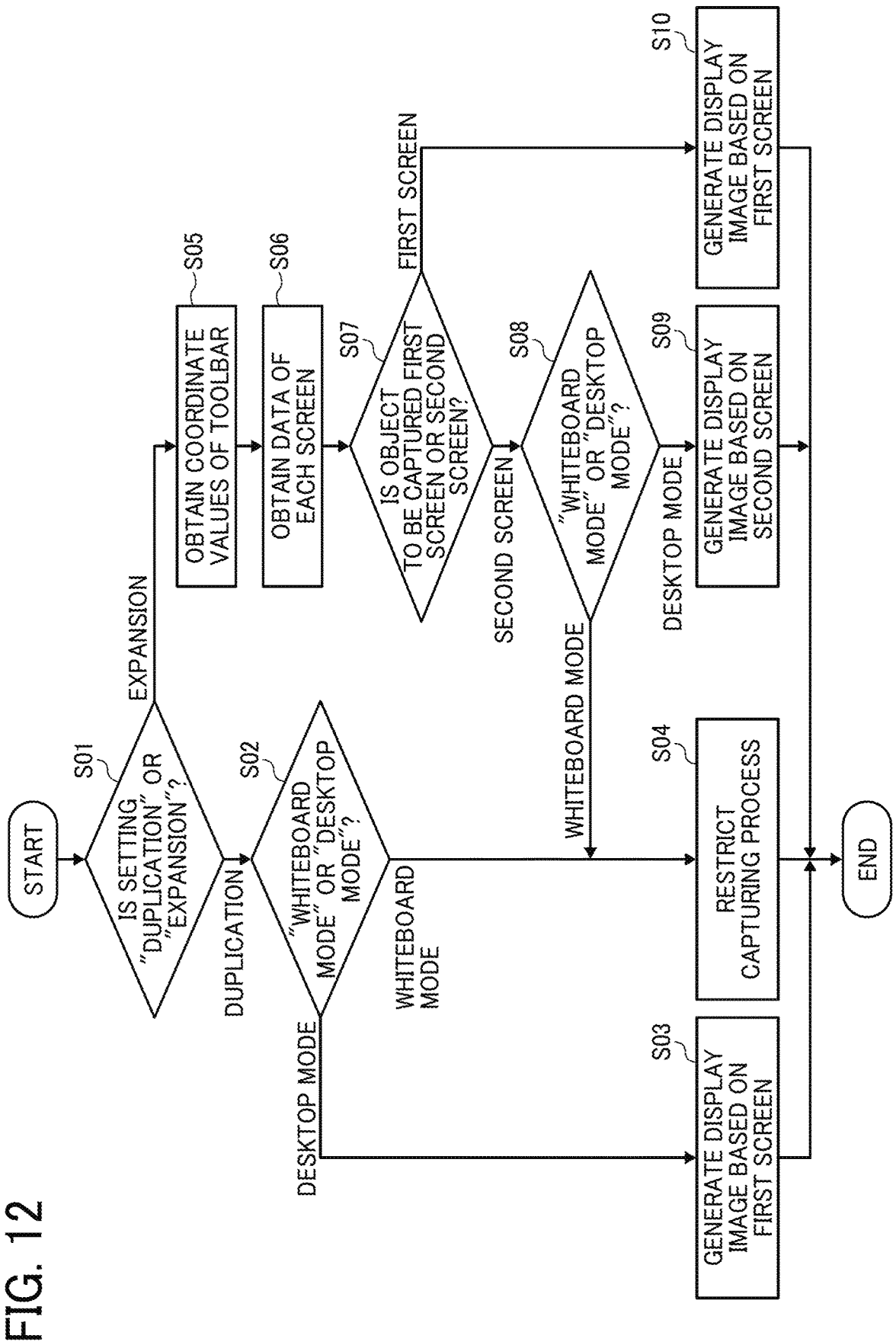
FIG. 12 is a flowchart of determining processes performed by an image processing device according to an embodiment of the present disclosure.

FIG. 12 is a flowchart of determining processes performed by the image processing device according to the present embodiment.

The laptop PC 6 performs the determining processes illustrated in FIG. 12, for example, when the toolbar CAP (see FIG. 10) is moved by a drag-and-drop operation or when the setting or the mode is switched.

In a step S01, the laptop PC 6 determines whether the setting is a "duplication" or "expansion". For example, the laptop PC 6 may obtain the set values that the user configures for the displays in the OS or the like in advance, determines whether the setting is "duplication" or "expansion" according to the obtained set values or the like. When it is determined that the setting is "duplication", the laptop PC 6 proceeds to a step S02. On the other hand, when it is determined that the setting is "expansion", the laptop PC 6 proceeds to a step S05.

In a step S02, the laptop PC 6 determines whether the mode is in the "whiteboard mode" or "desktop mode". For example, the laptop PC 6 determines whether the mode is in the "whiteboard mode" or "desktop mode" based on which of the whiteboard mode button BWBM and the desktop mode button BDTM, as illustrated in FIG. 10, is most recently pressed, or based on the settings made to the OS or the like. When it is determined that the mode is in the "desktop mode", the laptop PC proceeds to a step S03. On the other hand, when it is determined that the mode is in the "whiteboard mode", the laptop PC proceeds to a step S04.

In a step S03, the laptop PC 6 generates a display image based on the first screen. In other words, when the capture button BCAP (see FIG. 10) is pressed when the desktop mode is adopted at the "duplication" setting, the laptop PC 6 captures the desktop screen (see FIG. 8). More specifically, the laptop PC 6 stores an image of the desktop screen in the RAM 103 (see FIG. 5).

In a step S04, the laptop PC restricts the capturing process. For example, the laptop PC 6 may disable the capture button BCAP by graying out the button, or simply disable the capture button BCAP and accept no pressing operation for capturing.

Regardless of the setting being "duplication" or "expansion", in most cases, the user wishes to capture the desktop screen DSK when the mode is in the whiteboard mode. This is because the screen that is being displayed on the application screen APP (see FIG. 7 and FIG. 8) is the screen that is already displayed on the electronic whiteboard 2, and it is unlikely that the user wishes to capture it again to display it on the electronic whiteboard 2.

In a step S05, the laptop PC 6 obtains the coordinate values of the toolbar. For example, the laptop PC 6 obtains information about where a certain position of the toolbar CAP is displayed.

Figure 13:
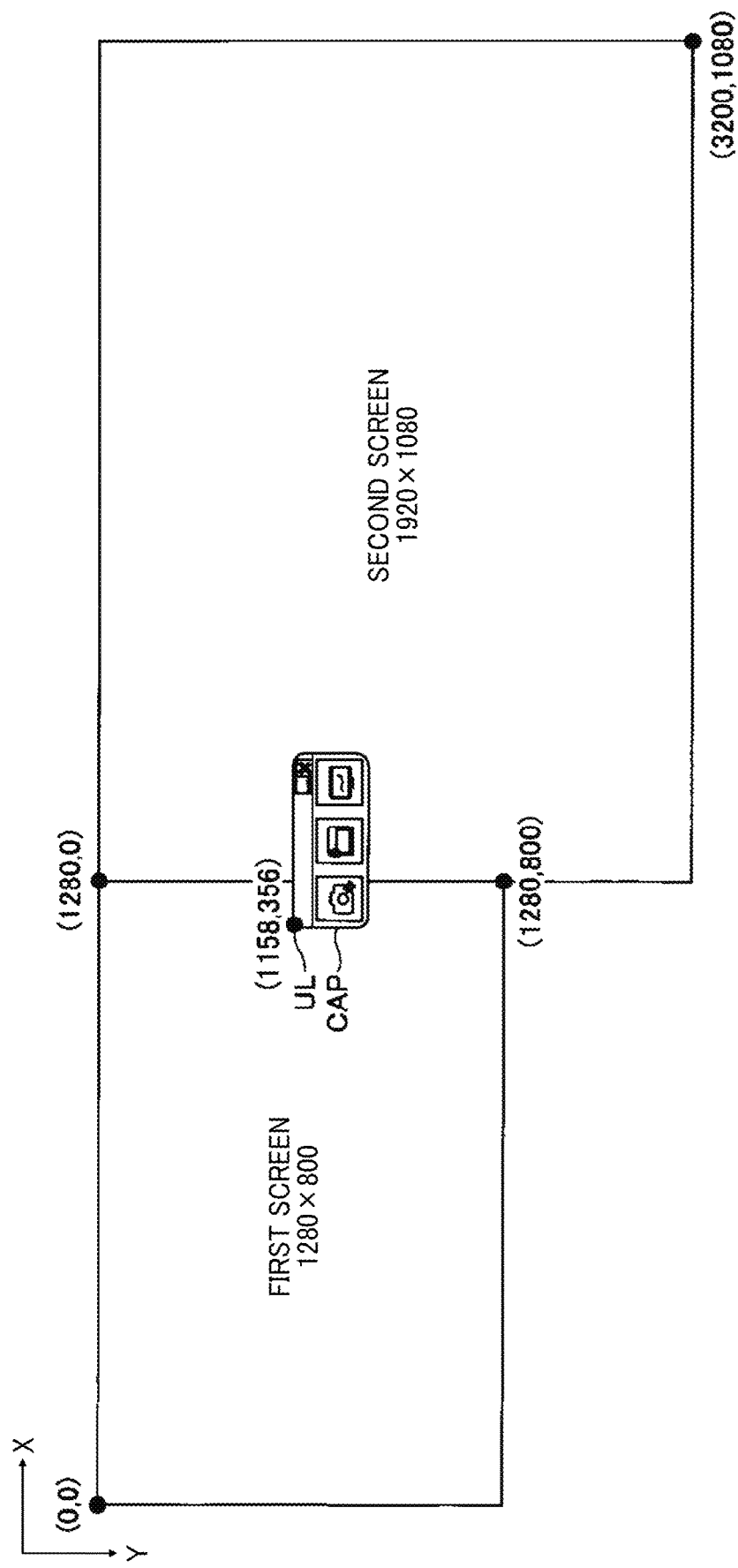
FIG. 13 is a diagram illustrating determining processes using certain positions of graphical user interfaces displayed by an image processing device according to an embodiment of the present disclosure.

FIG. 13 is a diagram illustrating determining processes using certain positions of graphical user interface displayed by the image processing device according to the present embodiment.

Next, an example case of the first screen and the second screen as illustrated in FIG. 13 is described.

First of all, the first screen is set to have the resolution of "1280×800" (so-called, wide extended graphics array (Wide XGA, WXGA)) in the present example case. On the other hand, the second screen is set to have the resolution of "1920×1080" (so-called, full high definition (FHD)) in the present example case. Then, as illustrated in FIG. 13, the top-left point of the first screen is set to the point of origin (0, 0). In the present example case, as illustrated in FIG. 13, the first screen and the second screen in the setting "expansion" are configured such that the right end of the first screen is combined with left end of the second screen. Further, in the present example case, the user can move the toolbar CAP within the first screen, within the second screen, and between the first screen and the second screen, by an operation of dragging the toolbar CAP. Note also that the arrangement of the first screen and the second screen is not limited to the arrangement as illustrated in FIG. 13. For example, the first screen and the second screen may be arranged the other way around.

In the step S05 (see FIG. 12), the laptop PC 6 obtains the coordinate values of the certain position of the toolbar CAP on the screens illustrated in FIG. 13. Note that the certain position is set in advance. For example, the certain position is the upper-left point UL. The certain position may be a point other than the upper-left point UL. For example, the certain position may be points as follows.

Figure 14:
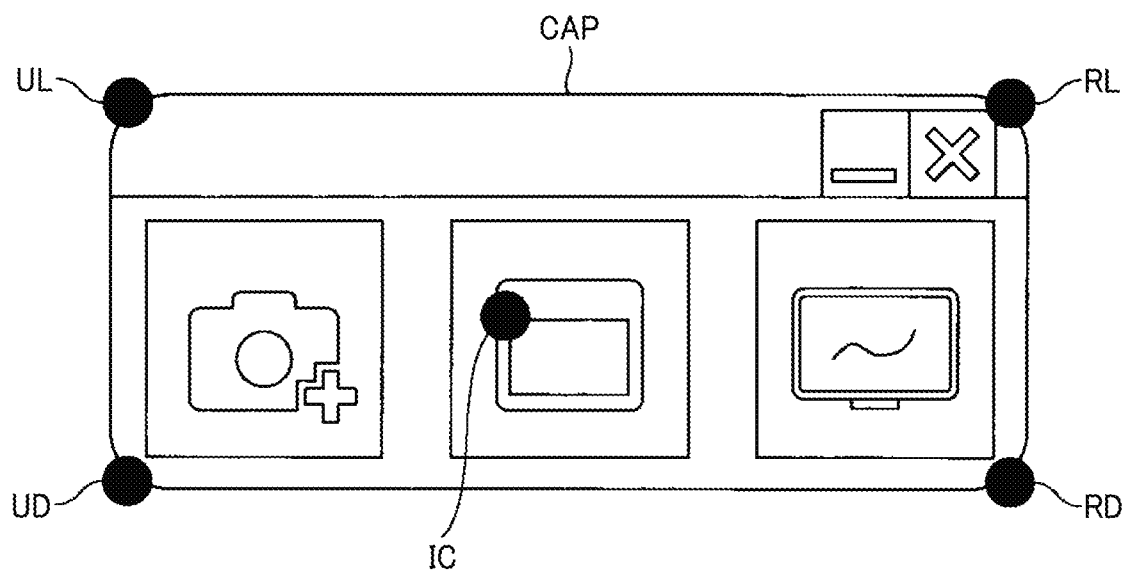
FIG. 14 is a diagram illustrating certain positions of graphical user interfaces displayed by an image processing device according to an embodiment of the present disclosure.

FIG. 14 is a diagram illustrating certain positions of graphical user interface displayed by an image processing device according to the present embodiment.

For example, the certain position, which is an object from which the coordinate values are to be obtained, may be four corners other than upper-left point UL. More specifically, as illustrated in FIG. 14, the certain position may be, for example, a lower-left point UD, an upper-right point RL, or a lower-right point RD. Alternatively, the certain position may be, for example, a centroid point IC or a point set by a user.

In a step S06, the laptop PC 6 obtains the data of each screen. For example, in the example case as illustrated in FIG. 13, the laptop PC 6 obtains data indicating, for example, the resolution (area data) of the first screen and the second screen. Accordingly, in the example case as illustrated in FIG. 13, the laptop PC 6 can determine that an area whose coordinate value in the X-axis is between "0" to "1279", i.e., an area whose coordinate value in the X-axis is equal to or less than "1279", belongs to the first screen. On the other hand, in the example case as illustrated in FIG. 13, the laptop PC 6 can determine that an area whose coordinate value in the X-axis is between "1280" to "3200", i.e., an area whose coordinate value in the X-axis is equal to or greater than "1280", belongs to the second screen.

In a step S07, the laptop PC 6 determines whether an object to be captured belongs to the first screen or the second screen. For example, the laptop PC 6 makes a determination depending on whether the coordinate values obtained in the step S05 belong to the first screen or the second screen, based on the data obtained in the step S06.

More specifically, in the example case as illustrated in FIG. 13, in the step S05, the laptop PC 6 obtains the coordinate values (1158, 356) of the upper-left point UL. Subsequently, the laptop PC 6 determines whether the coordinate value of the upper-left point UL in the X-axis is equal to or less than "1279" or equal to or greater than "1280" based on the data obtained in the step S06. In the present example as illustrated in FIG. 13, as the coordinate value "1158" is equal to or less than "1279, it is determined that the object to be captured belongs to the first screen. In other words, when upper-left point UL belongs to the area on the left side of FIG. 13, the laptop PC 6 determines that the object to be captured belongs to the first screen ("first screen" in the step S07). On the other hand, when upper-left point UL belongs to the area on the right side of FIG. 13, the laptop PC 6 determines that the object to be captured belongs to the second screen ("second screen" in the step S07).

A method of determining whether an object to be captured belongs to the first screen or the second screen is not limited to the above-described method where the coordinate value of the certain position is used. For example, the determining method may be a method where the area of the toolbar CAP is used as given below.

Figure 15:
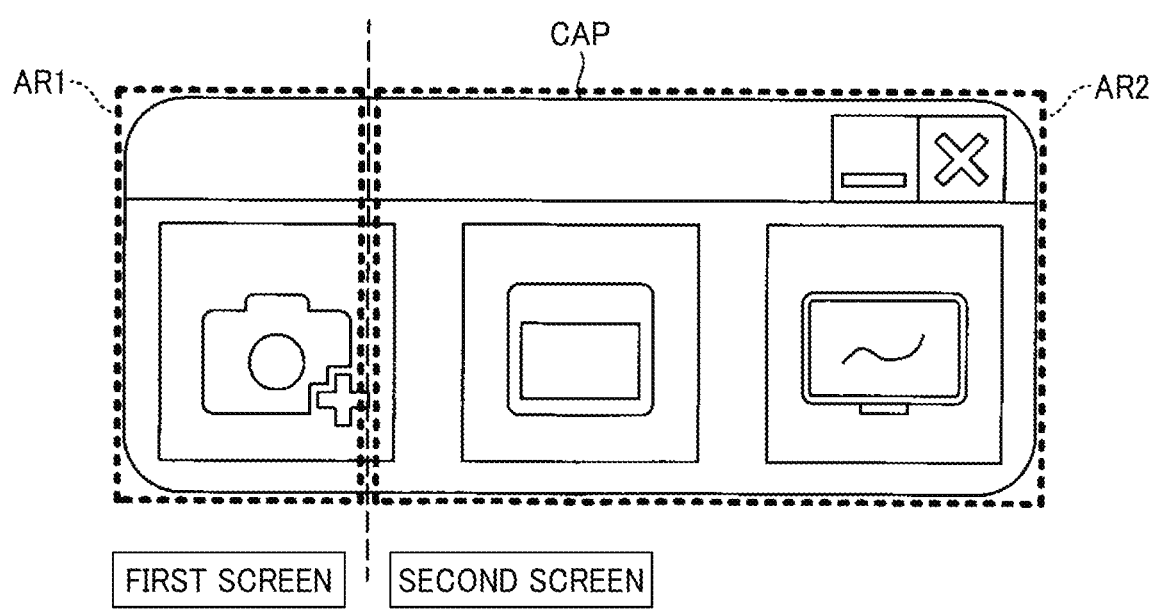
FIG. 15 is a diagram illustrating determining processes using areas of graphical user interfaces displayed by an image processing device according to an embodiment of the present disclosure.

FIG. 15 is a diagram illustrating determining processes using areas of the graphical user interface displayed by the image processing device according to the present embodiment. Hereinafter, in the example case as illustrated in FIG. 13, the area of the toolbar CAP that is displayed on the first screen out of the total area of the toolbar CAP is referred to as a first area AR1. On the other hand, the area of the toolbar CAP that is displayed on the second screen out of the total area of the toolbar CAP is referred to as a second area AR2. For example, the first area AR1 and the second area AR2 may be illustrated as in FIG. 15. In the example as illustrated in FIG. 15, when the first area AR1 and the second area AR2 are compared with each other, the second area AR2 is wider than the first area AR1. In order to handle such a situation, the laptop PC 6 determines that the object to be captured belongs to the second screen ("second screen" in the step S07 of FIG. 12).

Alternatively, the determining method may be a method in which the user is requested to determine an object to be captured by inputting an operation. For example, when a capturing process is requested, the laptop PC 6 displays a message that guides the user to click one of the two areas as illustrated in FIG. 13. Then, the user clicks one of the positions illustrated in FIG. 13 according to the displayed message. Subsequently, in the step S05 (see FIG. 12), the laptop PC 6 obtains the coordinate values of the clicked point. Then, in the step S07 (see FIG. 12), the laptop PC 6 may make a determination depending on whether the coordinate values of the clicked point belong to the first screen or the second screen based on the data obtained in the step S06 (see FIG. 12). In other words, the user clicks an area of the screen that he/she wishes to capture, and the laptop PC 6 may determine the object to be captured based on the coordinate values of the clicked point.

Alternatively, the method in which the user is requested to determine an object to be captured by inputting an operation may be, for example, a method in which buttons for selecting an object to be captured are displayed and the user is requested to select one of these two buttons. In other words, when a capturing process is requested, the laptop PC 6 displays a button to select the first screen as the object to be captured and a button to select the second screen as the object to be captured. Then, the laptop PC 6 determines that the screen of the pressed button is the object to be captured.

Furthermore, the determining method is not limited to a method where the X coordinate value is used. For example, depending on the settings or the like, there are some cases in which the first screen is combined with the second screen as follows.

Figure 16:
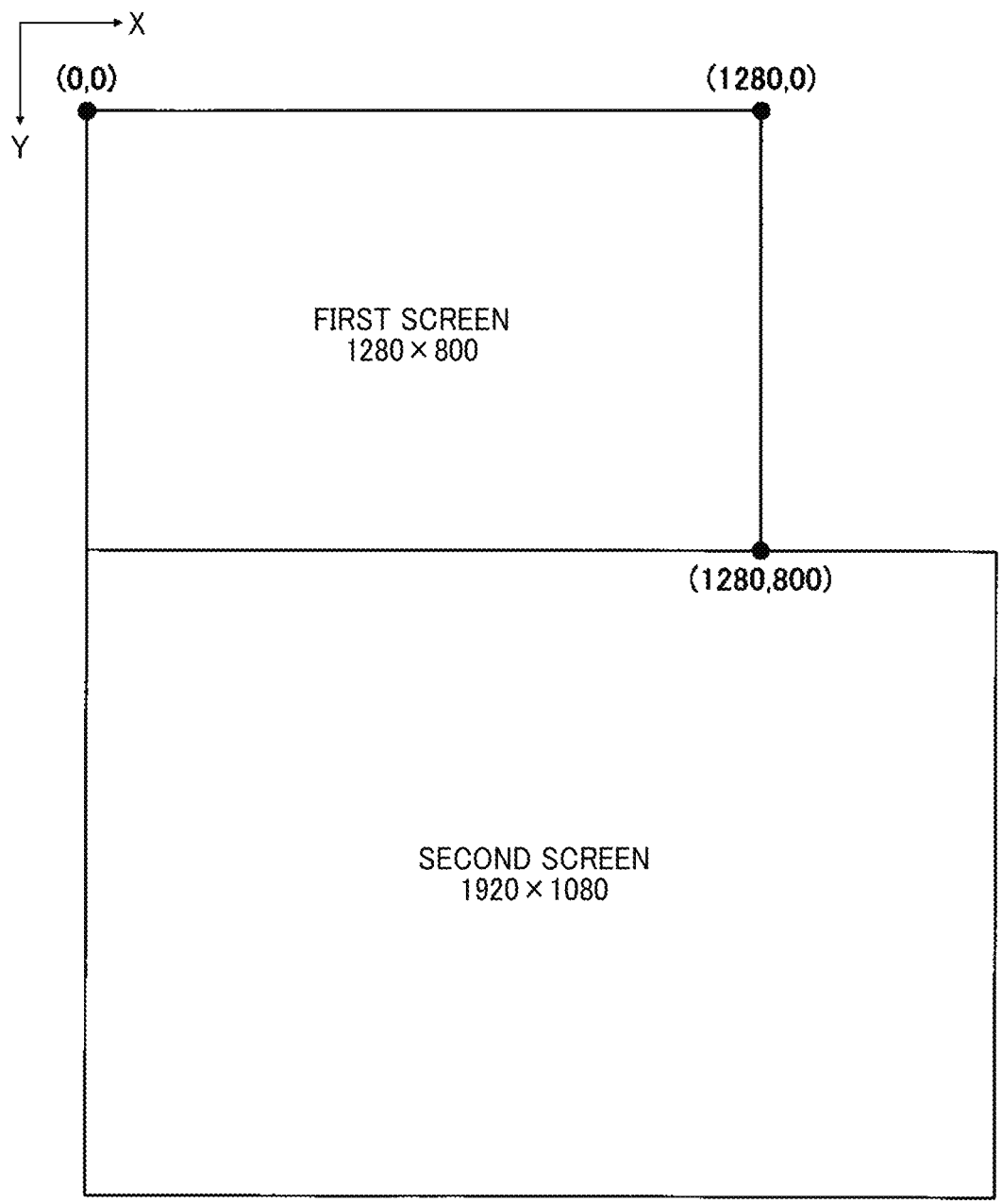
FIG. 16 is a diagram illustrating screens displayed by an image processing device using Y coordinate values, according to an embodiment of the present disclosure.

FIG. 16 is a diagram illustrating screens displayed by the image processing device using Y coordinate values, according to the present embodiment.

As illustrated in FIG. 16, there are some cases in which the first screen and the second screen are set to be combined in the vertical direction in FIG. 16, i.e., in the Y-axis direction. In such a configuration, in the step S07 (see FIG. 12), the laptop PC 6 make a determination using a Y coordinate value from the coordinate values obtained in the step S05 (see FIG. 12).

As illustrated in FIG. 12, in the step S08, the laptop PC 6 determines whether the mode is in the "whiteboard mode" or "desktop mode". For example, in the step S08, the laptop PC 6 make a determination similar to that of the step S02. Subsequently, when it is determined that the mode is in the "desktop mode", the laptop PC 6 proceeds to a step S09. On the other hand, when it is determined that the mode is in the "whiteboard mode", the laptop PC proceeds to a step S04.

In the step S09, the laptop PC 6 generates a display image based on the second screen. In other words, when the capture button BCAP (see FIG. 10) is pressed when the desktop mode is adopted at the "expansion" setting, the laptop PC 6 captures the desktop screen determined in the step S07. More specifically, in the step S09, the laptop PC 6 captures the second desktop screen DSK2 (see FIG. 11). In other words, the laptop PC 6 stores an image of the second desktop screen DSK2 in the RAM 103 (see FIG. 5).

In a step S10, the laptop PC 6 generates a display image based on the first screen. In other words, when the capture button BCAP (see FIG. 10) is pressed when the desktop mode is adopted at the "expansion" setting, the laptop PC 6 captures the desktop screen determined in the step S07. More specifically, in the step S10, the laptop PC 6 captures the first desktop screen DSK1 (see FIG. 11). For example, processes similar to those of the step S03 are performed in the step S10.

Once determining processes have been performed as above, the user can move the toolbar CAP and select the screen he/she wishes to capture. Note that the same goes for cases in which a user inputs an operation to move a reference material or the like to the screen that is determined to be the object to be captured. In particular, when the desktop mode is adopted at the "expansion" setting as illustrated on the lower side of FIG. 11, there are many cases in which the user wishes to select an object to be captured from the first desktop screen DSK1 (see FIG. 11) and the second desktop screen DSK2 (see FIG. 11). In view of the above circumstances, in the configuration as illustrated in FIG. 13, the user input an operation to move the toolbar CAP such that the top-left point UL will be placed in the area of the screen that is determined to be the object to be captured. Subsequently, once the laptop PC 6 has completed the determining processes as illustrated in FIG. 12, the laptop PC 6 can determine which one of the screens is the screen that the user wishes to capture, i.e., the screen that user wishes to set as the display image.

Due to this configuration, even when the laptop PC 6 displays a plurality of screens, the laptop PC 6 can capture a screen that the user wishes to choose as the display image to generate the display image. Once the display image captured and generated as above is taken in the image display apparatus, the reference material or the like that is prepared on the laptop PC 6 by a user can be displayed on the image display apparatus.

As described above, in order to set the first screen or the second screen as an object to be captured, the laptop PC 6 determines a partition between the first screen and the second screen. Note also that in the configuration illustrated in FIG. 6A and FIG. 6B, the determining unit 204 makes a determination based on the discrimination data acquired by the acquisition unit 202. Note also that the determination unit 204 is implemented, for example, by the CPU 101 (see FIG. 5).

For example, the determining unit 204 performs determining processes as follows, for example, when the electronic whiteboard 2 is connected to the laptop PC 6, when an application to capture a screen is executed, when processes of capturing the screen are performed, or before the processes of capturing the screen are performed.

Figure 17:
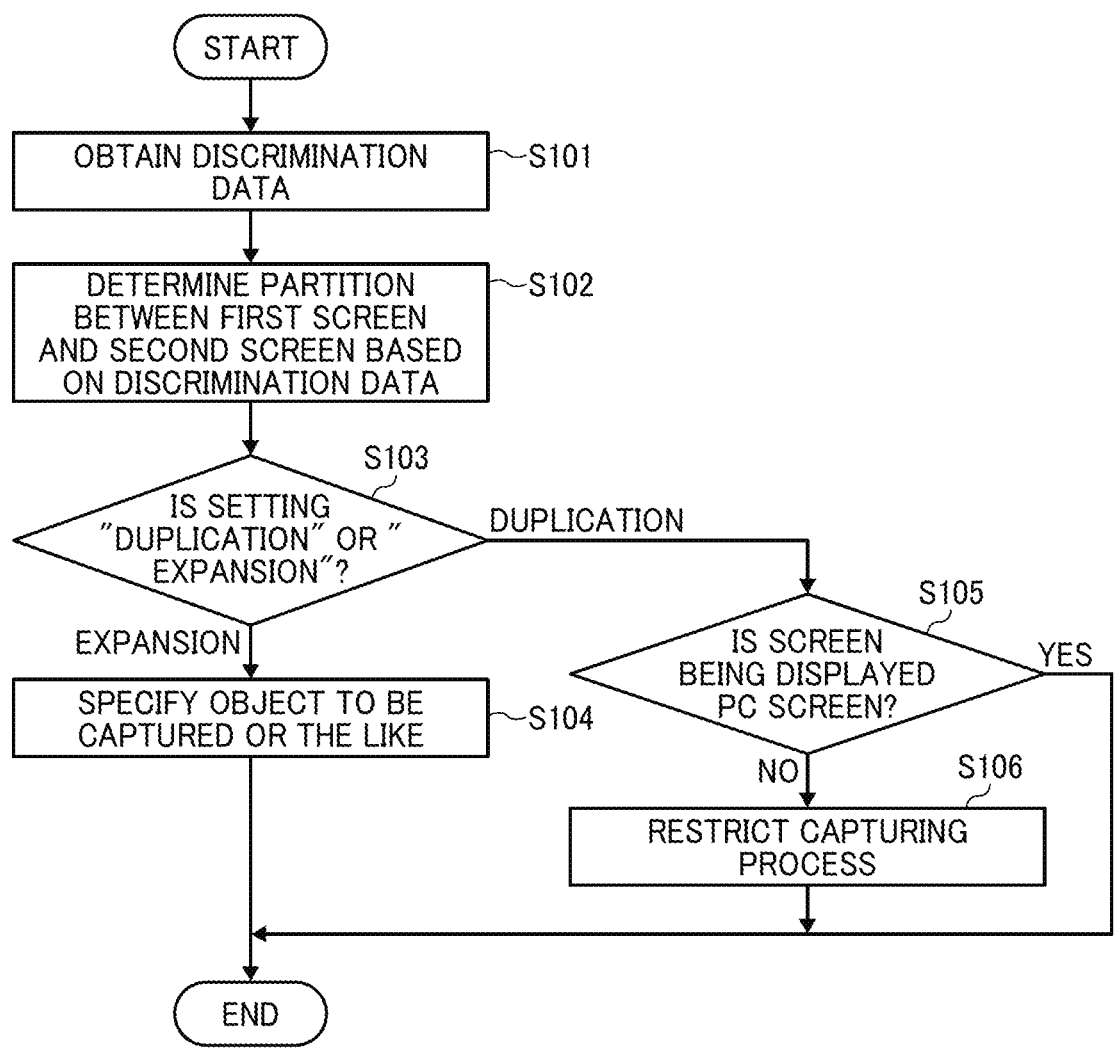
FIG. 17 is a flowchart of determining processes performed by an image processing device according to an embodiment of the present disclosure.

FIG. 17 is a flowchart of determining processes performed by the image processing device according to the present embodiment.

In a step S101, the laptop PC 6 obtains discrimination data. Hereinafter, cases in which the discrimination data is the EDID are described. Note that the discrimination data may include data other than the data used for discriminating between the first screen and the second screen. For example, the discrimination data may include the data of items related to a monitor, which indicates, for example, the model number of a connected image display apparatus. Alternatively, the discrimination data may include the data of the manufacturer of the connected image display apparatus. Moreover, the discrimination data may include the data of the resolution of the image display apparatus.

As described above, as, for example, the model number or the manufacturer of the image display apparatus can be determined based on the discrimination data, when an image display apparatus of specific manufacturer or model number is connected to the laptop PC 6, the laptop PC 6 can execute an application that is associated with the connected image display apparatus. When it is possible to obtain the discrimination data such as the EDID, the laptop PC 6 can recognize that an image display apparatus is connected thereto.

In a step S102, the laptop PC 6 determines a partition between the first screen and the second screen based on the discrimination data. Once the determining processes are completed, for example, the partition is determined as follows.

Figure 18:
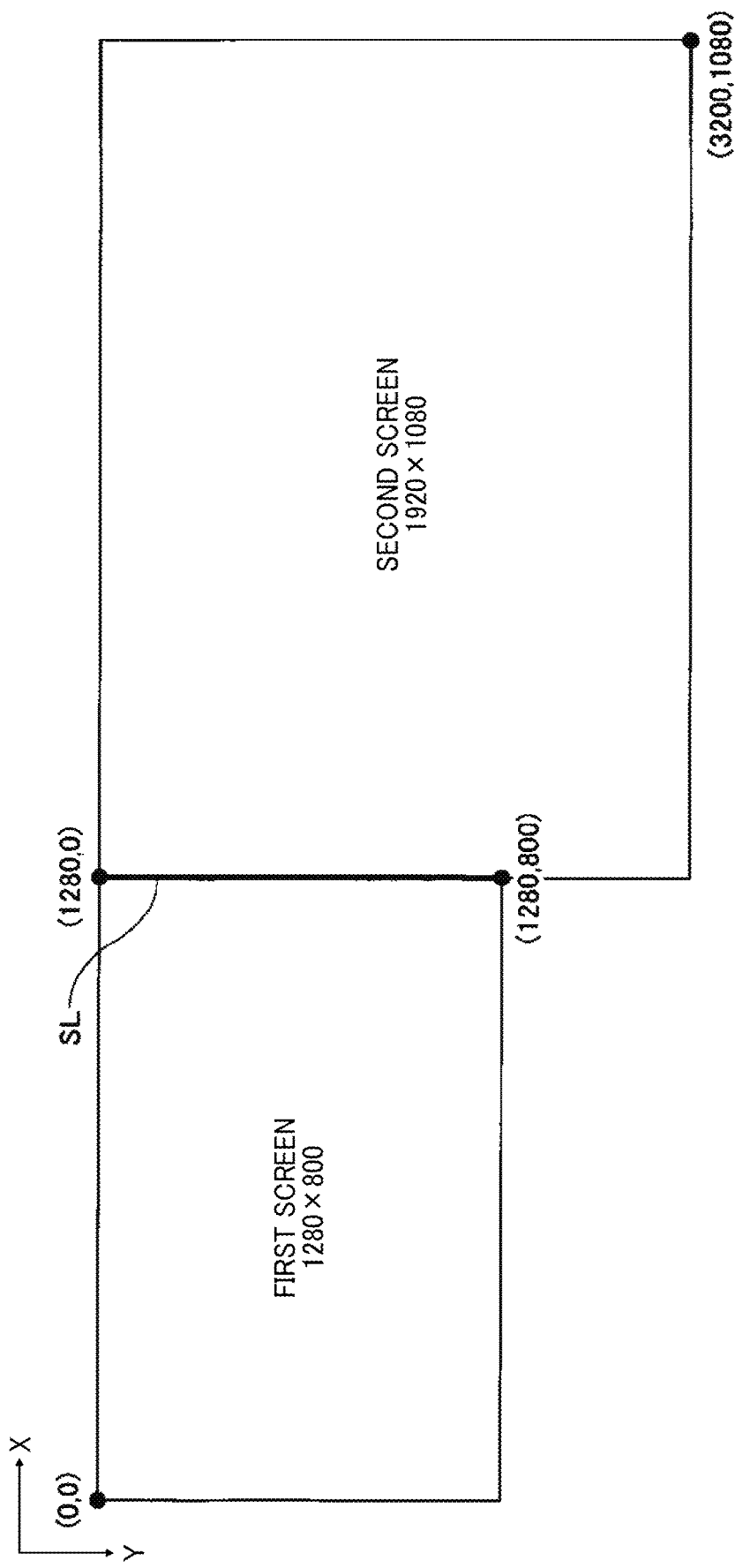
FIG. 18 is a diagram illustrating a partition determined by an image processing device between a first screen and a second screen, according to an embodiment of the present disclosure.

FIG. 18 is a diagram illustrating a partition determined by the image processing device between the first screen and the second screen, according to the present embodiment. For example, cases in which the configuration is similar to that of FIG. 13 are described. As illustrated in FIG. 13, when it is possible to obtain the discrimination data, the laptop PC 6 can determine the position of a boundary SL that indicates a partition between the first screen and the second screen. Accordingly, a partition between the area of the first screen and the area of the second screen can be determined based on the position of the boundary SL. In other words, in the present embodiment, the laptop PC 6 can determine a boundary SL that is an example of a partition between the first screen and the second screen, based on the discrimination data. In the present embodiment, the area on the left side of the boundary SL is determined to be the first screen, and the area on the right side of the boundary SL is determined to be the second screen. More specifically, when the X coordinate value is between "0 to 1279", the laptop PC 6 determines that the screen is the first screen. On the other hand, when the X coordinate value is between "1280 to 3200", the laptop PC 6 determines that the screen is the second screen. By so doing, as illustrated in FIG. 13, even when, for example, a plurality of screens are combined, the laptop PC 6 can handle the first screen and the second screen in a separate manner.

As illustrated in FIG. 17, in the step S103, the laptop PC 6 determines whether the setting is a "duplication" or "expansion". For example, the laptop PC 6 makes a determination in a similar manner to the process in the step S01 illustrated in FIG. 12. When it is determined that the setting is "duplication", the laptop PC 6 proceeds to a step S105. On the other hand, when it is determined that the setting is "expansion", the laptop PC 6 proceeds to a step S104.

In a step S104, the laptop PC 6 specifies an object to be captured or the like. Hereinafter, cases in which a screen is captured in the later steps of the processes of FIG. 17 are described. In this example case, an object to be captured is determined by the determining processes or the like as illustrated in FIG. 13. In other words, the laptop PC 6 performs determining processes based on the predetermined positions or the like of the toolbar through which an operation related to the capturing processes is input, to determine whether an object to be captured is the first screen or the second screen.

Alternatively, the screen to be captured may be set to the laptop PC 6 in advance. For example, assuming that the setting of the screens are as illustrated in FIG. 18, the screen that the user wishes to capture may be set to the first screen. By so doing, even when the first screen is combined with the second screen as illustrated in FIG. 18, once the capturing process is performed, the laptop PC 6 can extract the portion of the first screen and generate image data. As a matter of course, the screen that the user wishes to capture may be set to the second screen, and the portion of the second screen may be extracted to generate image data once the capturing process is performed.

In a step S105, the laptop PC 6 determines whether or not the screen being displayed is a PC screen. For example, the laptop PC 6 determines whether or not the screen being displayed is a PC screen depending on whether the mode is in the "whiteboard mode" illustrated on the upper side of FIG. 8 or the "desktop mode" illustrated on the bottom side of FIG. 8. In the present embodiment, when the mode is in the "desktop mode", the laptop PC 6 determines that the screen being displayed is a PC screen ("YES" in the step S105). Once it is determined that the screen being displayed is a PC screen, the laptop PC 6 terminates the processes. On the other hand, when it is determined that the screen being displayed is not a PC screen, the laptop PC 6 proceeds to a step S106.

In the step S106, the laptop PC restricts the capturing process. For example, the laptop PC 6 restricts the capturing process in a similar manner to the process in the step S04 illustrated in FIG. 12.

When capturing processes are performed after the determining processes as described above, for example, the laptop PC 6 can generate image data as follows.

Figure 19:
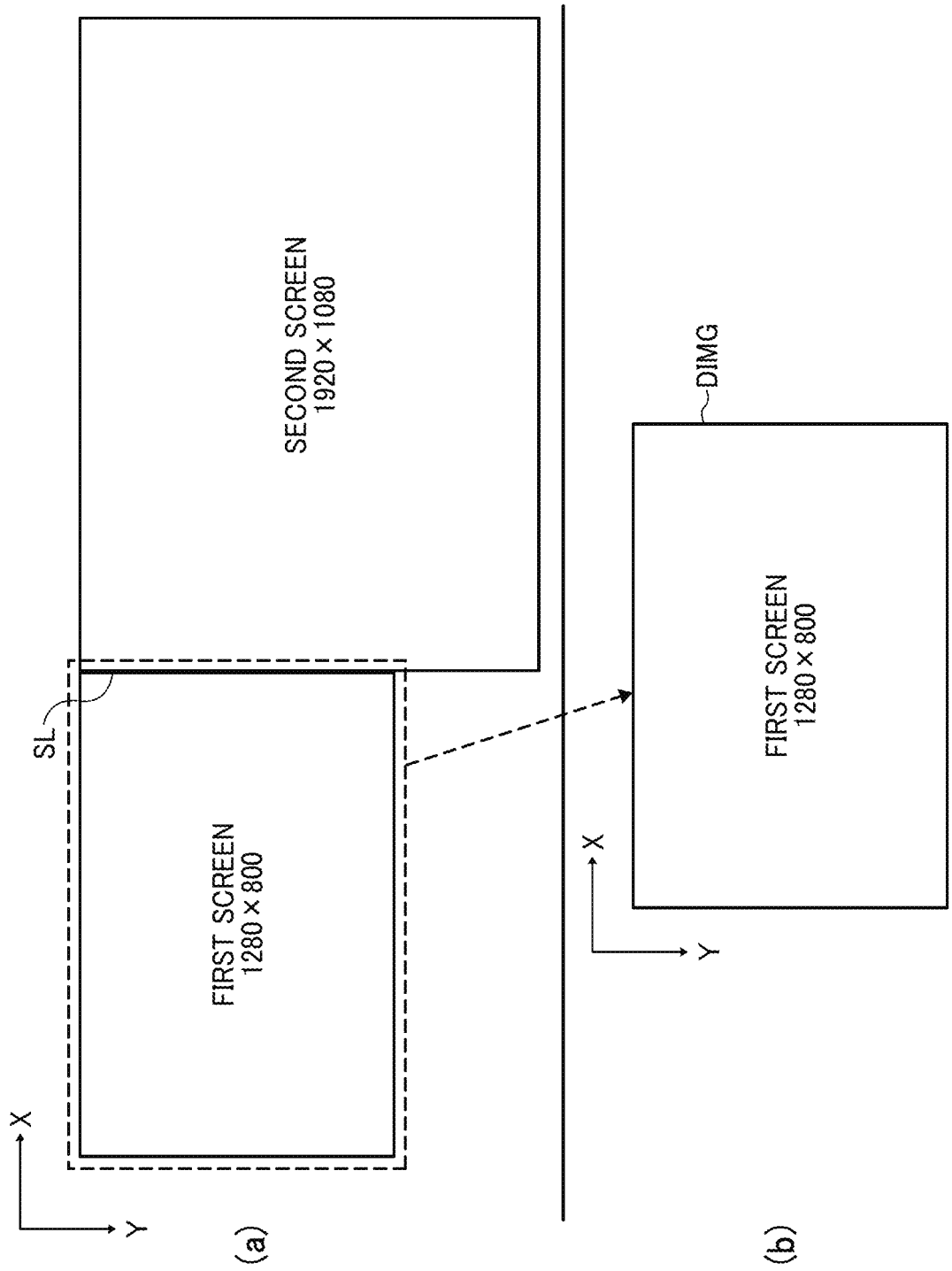
FIG. 19 is a diagram illustrating image data generated by an image processing device according to an embodiment of the present disclosure.

FIG. 19 is a diagram illustrating image data generated by the image processing device according to the present embodiment. First of all, the screen settings are illustrated as in FIG. 19A. In other words, the screen settings are as illustrated in FIG. 18. Then, if capturing processes are performed after the determining processes as described above, the laptop PC 6 can generate image data DIMG as illustrated in FIG. 19B. More specifically, even when the first screen is connected to the second screen as illustrated in FIG. 19A, determining processes may be performed to determine the boundary SL. Accordingly, the laptop PC 6 extracts the first screen from the combined multiple screens, and thus can generate image data DIMG that indicates the first screen, as illustrated in FIG. 19B.

By contrast, in cases where no determining process is performed, image data is generated as follows. Note that such cases will be referred to as a control sample in the following description.

Figure 20:
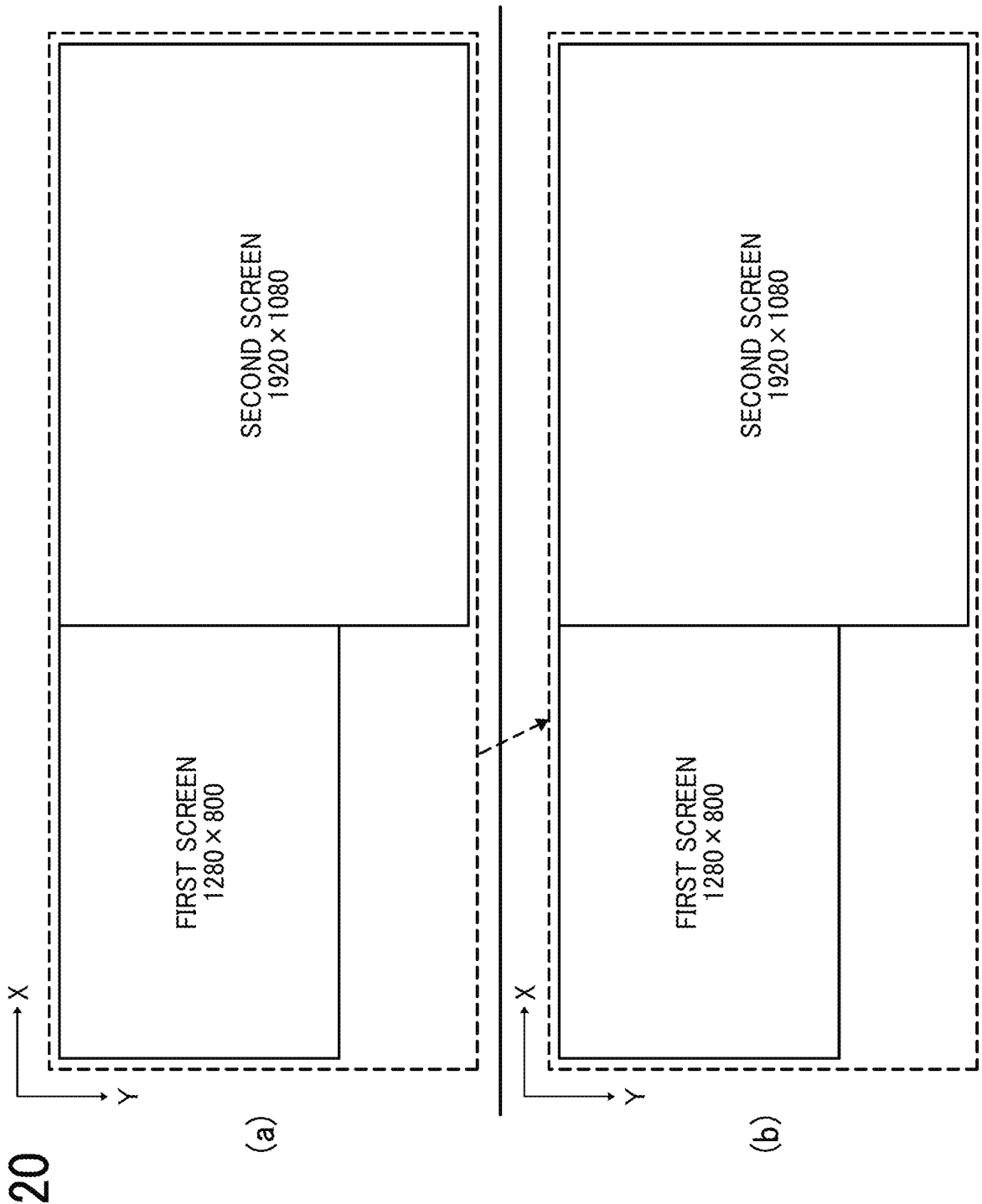
FIG. 20 is a diagram illustrating image data generated in a control sample.

FIG. 20 is a diagram illustrating image data generated in the control sample. The screen settings of FIG. 20A are similar to those of FIG. 19A. In other words, the first screen is combined with the second screen in FIG. 20A.

If determining processes are not performed, a partition between the first screen and the second screen cannot be determined by the laptop PC 6. For this reason, if a capturing process is performed, there are many cases where image data indicating both the first screen and the second screen is generated as illustrated in FIG. 20B. In such a configuration, a user has to use some sort of image and photo editing software to crop the portion of the first screen from the image data as illustrated in FIG. 20B.

By contrast, if the determining processes are performed, the laptop PC 6 can easily extract the portion of the first screen, and thus cropping operation or the like by the user can be omitted. Accordingly, the laptop PC 6 can improving the efficiency of capturing operation due to the determining processes.

Second Embodiment

A second embodiment of the present disclosure is implemented, for example, by the overall composition and the hardware configuration similar to those of the first embodiment. Hereinafter, the second embodiment of the present disclosure is described with the overall composition and the hardware configuration that are similar to those of the first embodiment, and the overlapping descriptions are omitted. The configuration of the second embodiment is different from that of the first embodiment in that condition determining processes are performed as given below.

<Condition Determining Processes>

For example, the laptop PC 6 may be provided with a condition determining unit that performs condition determining processes as follows. Note also that the condition determining unit is implemented, for example, by the CPU 101 (see FIG. 5).

Figure 21:
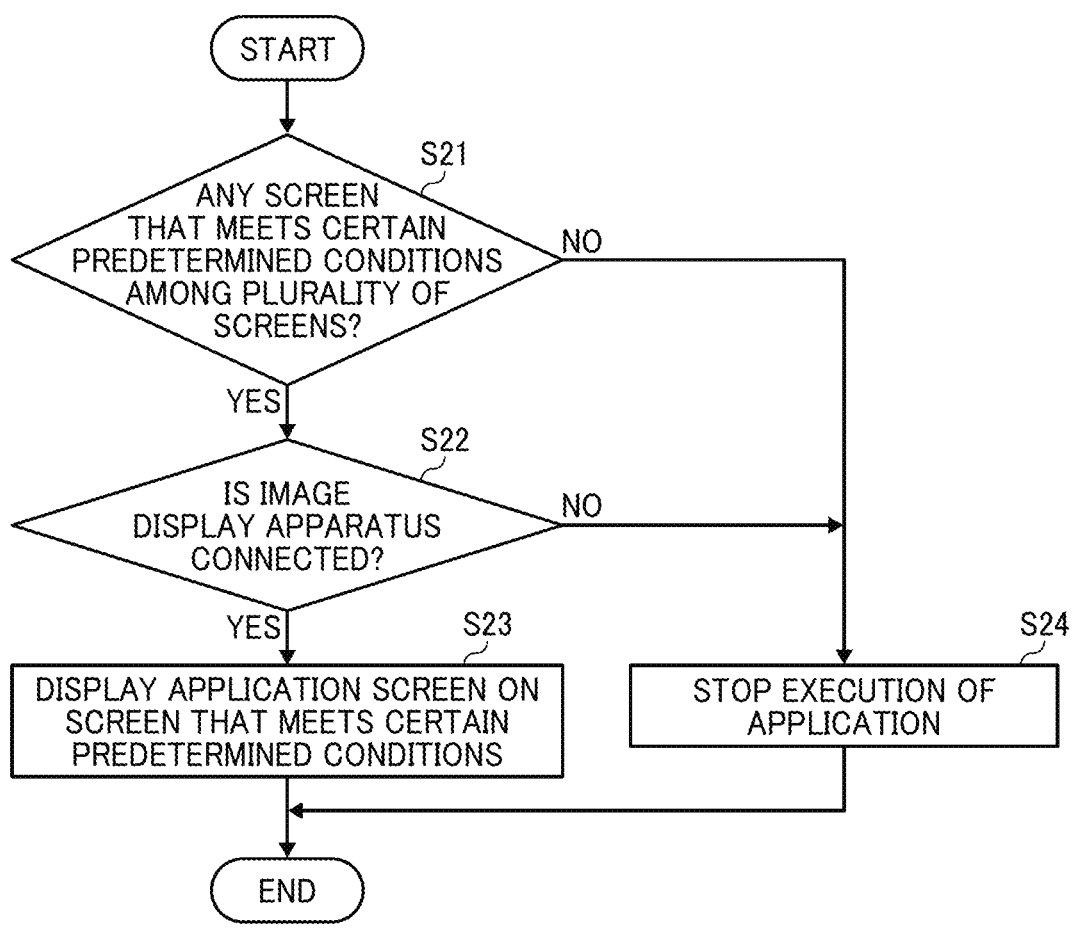
FIG. 21 a flowchart of condition determining processes performed by an image processing device according to an embodiment of the present disclosure.

FIG. 21 a flowchart of condition determining processes performed by an image processing device according to an embodiment of the present disclosure. Note that such condition determining processes are performed, for example, when an application is started up or when the settings on a screen are changed.

In a step S21, the laptop PC determines whether or not there is a screen that meets certain predetermined conditions among a plurality of screens. For example, cases in which the laptop PC 6 displays screens on the display of the laptop PC 6 and the display of the electronic whiteboard 2, as illustrated in FIG. 2, are described. In such a configuration, depending on the specification or the like of the electronic whiteboard 2, there are some cases in which a screen cannot be displayed on the display of the electronic whiteboard 2 when predetermined conditions are not met.

For example, whether the display has a resolution equal to or greater than a predetermined degree of resolution is a part of such predetermined conditions. Hereinafter, cases are described in which a screen cannot be displayed on the display of the electronic whiteboard 2 unless the resolution of the screen is "1920×1080" pixels (full high definition (FHD)). In the present embodiment, a user sets the certain predetermined conditions "screen of FHD resolution" to the laptop PC 6 in advance. In the following description, as illustrated in FIG. 11, cases in which the setting "expansion" is set to the laptop PC 6 are described.

In the step S21 of the present embodiment, the laptop PC 6 determines whether or not one of or both the first screen and the second screen have the resolution of FHD. Note also that the resolution of each screen is obtained by the laptop PC 6 as in the step S06 illustrated in FIG. 12. For example, in the configuration illustrated in FIG. 13, the second screen has the resolution of 1920×1080 pixels, and thus it is determined that the second screen is of FHD. For this reason, in the configuration as illustrated in FIG. 13, the laptop PC 6 determines that there is a screen that meets certain predetermined conditions ("YES" in the step S21).

When there is a screen that meets certain predetermined conditions among a plurality of screens ("YES" in the step S21), the laptop PC 6 proceeds to a step S22. On the other hand, when there is no screen that meets certain predetermined conditions among a plurality of screens ("NO" in the step S21), the laptop PC 6 proceeds to a step S24.

In a step S22, the laptop PC determines whether the image display apparatus is connected to the laptop PC. For example, the laptop PC checks whether or not the cable 10 illustrated in FIG. 2 is electrically connected to the laptop PC, and also determines whether the electronic whiteboard 2 is connected to the laptop PC.

In the present embodiment, unless the laptop PC 6 is electrically connected to the electronic whiteboard 2 through the cable 10, it is difficult for the laptop PC 6 to receive various kinds of data from the electronic whiteboard 2. In order to handle such a situation, there are many cases in which data cannot be sent to an application even when some drawings are drawn on the electronic whiteboard 2. In view of the above circumstances, if whether or not the cable 10 is electrically connected to the laptop PC 6 is determined as in the step S22, the laptop PC 6 can reduce cases in which drawing drawn on the electronic whiteboard 2 are not reflected to the application.

When the image display apparatus is connected to the laptop PC ("YES" in the step S22), the laptop PC proceeds to a step S23. On the other hand, when the image display apparatus is not connected to the laptop PC ("NO" in the step S22), the laptop PC proceeds to a step S24.

Note also that the step S21 and the step S22 may be performed separately as illustrated in FIG. 21, or the determination in the step S22 may be included in the certain predetermined conditions in the step S21.

In a step S23, the laptop PC displays an application screen on the screen that meets the certain predetermined conditions. For example, in the example illustrated in FIG. 13, the second screen is a screen that meets the certain predetermined conditions. In view of the above circumstances, in the step S23, the laptop PC displays an application screen APP (see FIG. 7) on the second screen. By so doing, for example, the laptop PC displays screens as illustrated in the lower side (the row of "expansion") of FIG. 7.

In a step S24, the laptop PC stops the execution of the application.

Once condition determining processes have been performed as above, the laptop PC 6 can determine whether or not there is a screen that meets certain predetermined conditions, in particular, conditions related to the resolution, among a plurality of screens.

there are some cases in which a screen cannot be displayed on the image display apparatus due to, for example, the specification of the image display apparatus when predetermined conditions are not met. In order to handle such a situation, it is desired that the application screen APP (see FIG. 7) be displayed on such a screen that meets the certain predetermined conditions as described above. In order to handle such a situation, firstly, the laptop PC determines whether or not there is a screen that meets certain predetermined conditions. When there is a screen that meets certain predetermined conditions, the laptop PC displays an application screen APP on such a screen that meets the certain predetermined conditions.

Once an application screen APP is displayed on such a screen that meets the certain predetermined conditions as described above, the user tends to operate the application screen APP on the screen that meets the certain predetermined conditions. In order to handle such a situation, the laptop PC 6 displays on the image display apparatus a screen that can be displayed using an application.

There are some cases in which a user is unaware of which one of a plurality of screens is a screen that meets certain predetermined conditions. In order to handle such a situation, there are some cases in which the user is unaware of which screen is appropriate to display the application screen APP when he/she wishes to use the image display apparatus. In order to avoid such a situation, the laptop PC can determine a screen that meets certain predetermined conditions and execute an application. Due to this configuration, the user can use the image display apparatus with the application.

Note also that even when the setting of "duplication" is set to the laptop PC 6, for example, unless the screen has a resolution equal to or greater than the predetermined resolution, the application screen APP may lie offscreen. In order to avoid such a situation, the above-described method may be performed when the setting of "duplication" is set to the laptop PC 6.

<Variations>

In the embodiments described above, an image display apparatus is referred to as the electronic whiteboard 2 (see FIG. 2). However, the electronic whiteboard 2 may be referred to as, for example, an electronic information board and an interactive whiteboard.

In the present embodiment, application to the electronic whiteboard 2 is described. However, application may be made to large numbers of things, such as any device that generates data and continuously uses the generated data.

For purposes of simplification, the functions of the electronic whiteboard 2 have been illustrated in a divided manner in the embodiments as described above. Accordingly, no limitation is intended by how the processes are divided or by the name of the processes. For example, the processes that are performed by the electronic whiteboard 2 may be divided into a larger number of processes depending on what is processed therein. Alternatively, one unit of processes may include a larger number of processes.

Note also that it is not necessary for one information processing apparatus to implement both an image display apparatus and an image processing device. In other words, an image display apparatus and an image processing device may be implemented by an information processing system that includes two or more information processing devices. Alternatively, a part of or the entirety of the processes that are performed by an image display apparatus or an image processing device may be performed in a distributed, redundant, or parallel manner or in a combination of such a distributed, redundant, and parallel manners.

Numerous additional modifications and variations are possible in light of the above teachings. It is therefore to be understood that within the scope of the appended claims, this disclosure may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image processing device, comprising:
   circuitry configured to:
   generate a desktop screen and an application screen to be displayed on a first display or a second display, the application screen corresponding to executing an application;
   acquire, from the second display, display identification data of the second display;
   determine a display partition for operating the first display and the second display based on the acquired display identification data;
   control the first display and the second display to display the desktop screen or the application screen based on the determined display partition;
   when the first display and the second display are controlled in a duplication mode and both of the first display and the second display are set to display the application screen without displaying the desktop screen, disable execution of a capturing process for capturing a screen image displayed on the first display or the second display; and
   when the first display and the second display are controlled in the duplication mode and the first display is displaying the desktop screen, permit execution of a capturing process for capturing the screen image displayed on the first display or the second display.

2. The image processing device according to claim 1, wherein, when the first display and the second display are controlled in an expansion mode, the circuitry is further configured to:
   set the first display to display the desktop screen; and
   set the second display to display the application screen.

3. The image processing device according to claim 2, wherein the circuitry is further configured to:
   generate the application screen based on a captured image of the desktop screen.

4. The image processing device according to claim 3, wherein the circuitry is further configured to:
   when an operation input to the second display corresponding to a user drawing over the captured image is received, generate an updated application screen where the user drawing drawn is integrated with the captured image.

5. The image processing device according to claim 1, wherein the circuitry is further configured to:
   execute the capturing process for capturing the screen image displayed on the first display or the second display in response to a user input when the execution of the capturing process is enabled.

6. The image processing device according to claim 5, wherein the circuitry is further configured to:
   generate a graphical user interface to be displayed on the first display or the second display and for receiving a user input instructing the execution of the capturing process.

7. The image processing device according to claim 6, wherein the circuitry is further configured to:
   determine one of the first display and the second display where a certain portion of the graphical user interface is displayed; and
   execute the capturing process for capturing the screen image displayed on the determined one of the first display and the second display.

8. The image processing device according to claim 6, wherein the circuitry is further configured to:
   determine one of the first display and the second display by comparing a first area of the graphical user interface displayed on the first display with a second area of the graphical user interface displayed on the second display; and execute the capturing process for capturing the screen image displayed on the determined one of the first display and the second display.

9. The image processing device according to claim 1, wherein the display identification data of the second display indicates at least one of a model number of the second display, a maker of the second display, and a resolution of the second display.

10. The image processing device according to claim 1, wherein the display identification data of the second display is extended display identification data of the second display.

11. An image processing system, comprising:
an image display; and
an information processor, comprising:
a display;
circuitry communicatively coupled with the display and the image display and configured to:
generate a desktop screen and an application screen to be displayed on the display or the image display, the application screen corresponding to executing an application;
acquire, from the image display, display identification data of the image display;
determine a display partition for operating the display and the image display based on the acquired display identification data;
control the display and the image display to display the desktop screen or the application screen based on the determined display partition;
when the display and the image apparatus are controlled in a duplication mode and both of the display and the image apparatus are set to display the application screen without displaying the desktop screen, disable execution of a capturing process for capturing a screen image displayed on the display or the image display; and
when the first display and the second display are controlled in the duplication mode and the first display is displaying the desktop screen, permit execution of a capturing process for capturing the screen image displayed on the first display or the second display.

12. An image processing method, comprising:
generating a desktop screen and an application screen to be displayed on a first display or a second display, the application screen corresponding to executing an application;
acquiring, from the second display, display identification data of the second display;
determining a display partition for operating the first display and the second display based on the acquired display identification data;
controlling the first display and the second display to display the desktop screen or the application screen based on the determined display partition;
when the first display and the second display are controlled in a duplication mode and both of the first display and the second display are set to display the application screen without displaying the desktop screen, disabling execution of a capturing process for capturing a screen image displayed on the first display or the second display; and when the first display and the second display are controlled in the duplication mode and the first display is displaying the desktop screen, permit execution of a capturing process for capturing the screen image displayed on the first display or the second display.

13. The method according to claim 12, wherein when the first display and the second display are controlled in the expansion mode, the method further performs:
setting the first display to display the desktop screen; and
setting the second display to display the application screen.

14. The method according to claim 13, further comprising:
generating the application screen based on a captured image of the desktop screen.

15. The method according to claim 12, further comprising:
executing the capturing process for capturing the screen image displayed on the first display or the second display in response to a user input when the execution of the capturing process is enabled.

16. The method according to claim 15, further comprising:
generating a graphical user interface to be displayed on the first display or the second display and for receiving a user input instructing the execution of the capturing process.

17. The method according to claim 16, further comprising:
determining one of the first display and the second display where a certain portion of the graphical user interface is displayed; and
executing the capturing process for capturing the screen image displayed on the determined one of the first display and the second display.

18. The method according to claim 16, further comprising:
determining one of the first display and the second display by comparing a first area of the graphical user interface displayed on the first display with a second area of the graphical user interface displayed on the second display; and
executing the capturing process for capturing the screen image displayed on the determined one of the first display and the second display.

19. The method according to claim 12, wherein the display identification data of the second display indicates at least one of a model number of the second display, a maker of the second display, and a resolution of the second display.

* * * * *